US012722405B2

(12) United States Patent
Nonaka et al.

(10) Patent No.: US 12,722,405 B2
(45) Date of Patent: Sep. 1, 2026

(54) PRINTING DEVICE

(71) Applicant: Roland DG Corporation, Hamamatsu (JP)

(72) Inventors: Ryosuke Nonaka, Hamamatsu (JP); Misaki Okuda, Hamamatsu (JP); Naomi Yamamura, Hamamatsu (JP)

(73) Assignee: ROLAND DG CORPORATION, Shizuoka (JP)

( * ) Notice: Subject to any disclaimer, the term of this patent is extended or adjusted under 35 U.S.C. 154(b) by 57 days.

(21) Appl. No.: 18/824,222

(22) Filed: Sep. 4, 2024

(65) Prior Publication Data

US 2025/0074079 A1 Mar. 6, 2025

(30) Foreign Application Priority Data

Sep. 5, 2023 (JP) ................................ 2023-143928
Sep. 5, 2023 (JP) ................................ 2023-143929

(51) Int. Cl.

*B41J 11/00* (2006.01)
*B41J 11/70* (2006.01)
*B41J 15/04* (2006.01)

(52) U.S. Cl.

CPC ............ *B41J 11/006* (2013.01); *B41J 11/007* (2013.01); *B41J 11/706* (2013.01); *B41J 15/042* (2013.01)

(58) Field of Classification Search

CPC ...... B41J 11/006; B41J 15/042; B41J 11/007; B41J 11/706

See application file for complete search history.

(56) References Cited

U.S. PATENT DOCUMENTS

| | | | | |
|---|---|---|---|---|
| 5,637,070 A * | 6/1997 | Sasai | B41J 11/0005 493/321 |
| 6,461,065 B2 * | 10/2002 | Mogi | B41J 13/0045 400/613 |
| 8,029,203 B2 * | 10/2011 | Kase | B41J 15/046 400/613 |
| 8,764,327 B2 * | 7/2014 | Yamada | B41J 11/006 400/613 |

(Continued)

FOREIGN PATENT DOCUMENTS

| | | |
|---|---|---|
| JP | S62005868 A | 1/1987 |
| JP | H02086795 U | 7/1990 |

(Continued)

*Primary Examiner* — Christle I Marshall
(74) *Attorney, Agent, or Firm* — Keating & Bennett, LLP

(57) ABSTRACT

A printing device includes a roll holder to support a recording medium roll so as to be rotatable in a front-rear direction, a support table that is higher than the roll holder and supports the recording medium drawn from the medium roll, a print head, a conveyor to transfer the recording medium forward on the support table to draw the recording medium from the medium roll and transfer the recording medium rearward on the support table to pull back the recording medium toward the roll holder, and a receiver that is lower than and spaced away from a transfer path of the recording medium extending from the medium roll to the support table along which the recording medium is drawn from the medium roll and transferred. The receiver is capable of receiving the pulled-back recording medium, and includes a receiving portion that slopes downward while extending forward or rearward.

15 Claims, 13 Drawing Sheets

(56) References Cited

U.S. PATENT DOCUMENTS

| | | | | |
|---|---|---|---|---|
| 9,162,483 | B2 * | 10/2015 | Matsumoto | B41J 15/046 |
| 2014/0291375 | A1 | 10/2014 | Mashima et al. | |

FOREIGN PATENT DOCUMENTS

| | | | |
|---|---|---|---|
| JP | H07044520 | U | 11/1995 |
| JP | H09011567 | A | 1/1997 |
| JP | 2014195895 | A | 10/2014 |

* cited by examiner

PRINTING DEVICE

CROSS-REFERENCE TO RELATED APPLICATIONS

This application claims priority based on Japanese Patent Application No. 2023-143928, filed on Sep. 5, 2023, and Japanese Patent Application No. 2023-143929, filed on Sep. 5, 2023, the entire contents of which are incorporated herein by reference.

BACKGROUND OF THE INVENTION

1. Field of the Invention

The present invention relates to printing devices.

2. Description of the Related Art

Printing devices are known in the art that draw a recording medium from a roll of wound recording medium to print on the drawn recording medium. For example, JP 2014-195895 A discloses a recording device including a paper feed mechanism that rotatably supports a roll of paper, a platen on which the drawn roll paper is placed, a recording head, a paper feed path through which the roll paper is transferred, and transfer rollers provided along the paper feed path. The paper feed path for roll paper is formed by a pair of members that oppose each other with an interval therebetween through which the roll paper can pass.

With a printing device, the recording medium may be pulled back upstream in the transfer direction. For example, with the recording device disclosed in JP 2014-195895 A, when the roll paper is pulled back, the roll paper slacks and sags between the feed path formed by a pair of opposing members and the roll. When the recording medium slacks and sags, the recording medium may fold over inside the recording device, which may cause a jam.

SUMMARY OF THE INVENTION

Example embodiments of the present invention provide printing devices each capable of reducing or preventing jams of a recording medium that has become slack due to the pull-back operation.

A printing device disclosed herein includes a roll holder to support a medium roll, which is a recording medium wound into a roll, so that the medium roll can rotate in a front-rear direction, a support table that is higher than the roll holder and supports the recording medium drawn from the medium roll, a print head that is higher than the support table so as to oppose the support table, a conveyor to transfer the recording medium in the front-rear direction on the support table, wherein the conveyor is operable to transfer the recording medium forward on the support table to draw the recording medium from the medium roll and transfer the recording medium rearward on the support table to pull back the recording medium toward the roll holder, and a receiver that is below and spaced away from a transfer path of the recording medium extending from the medium roll to the support table along which the recording medium is drawn from the medium roll and transferred. The receiver is capable of receiving the recording medium pulled back toward the roll holder, and includes a receiving portion that slopes downward and extends forward or rearward.

With the printing device described above, when the recording medium sagging from the transfer path due to the pull-back operation of the conveyor falls on the receiving portion, the recording medium is gradually guided downward along the downward slope of the receiving portion. This prevents the recording medium from piling up, thereby reducing or preventing jams of the recording medium.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Hereinafter, with reference to the drawings, an inkjet printer 10 (hereinafter referred to as the printer 10) according to one example embodiment will be described. The printer 10 according to the present example embodiment is an inkjet printer with a cutting head capable of printing and cutting a recording medium 5.

Figure 1:
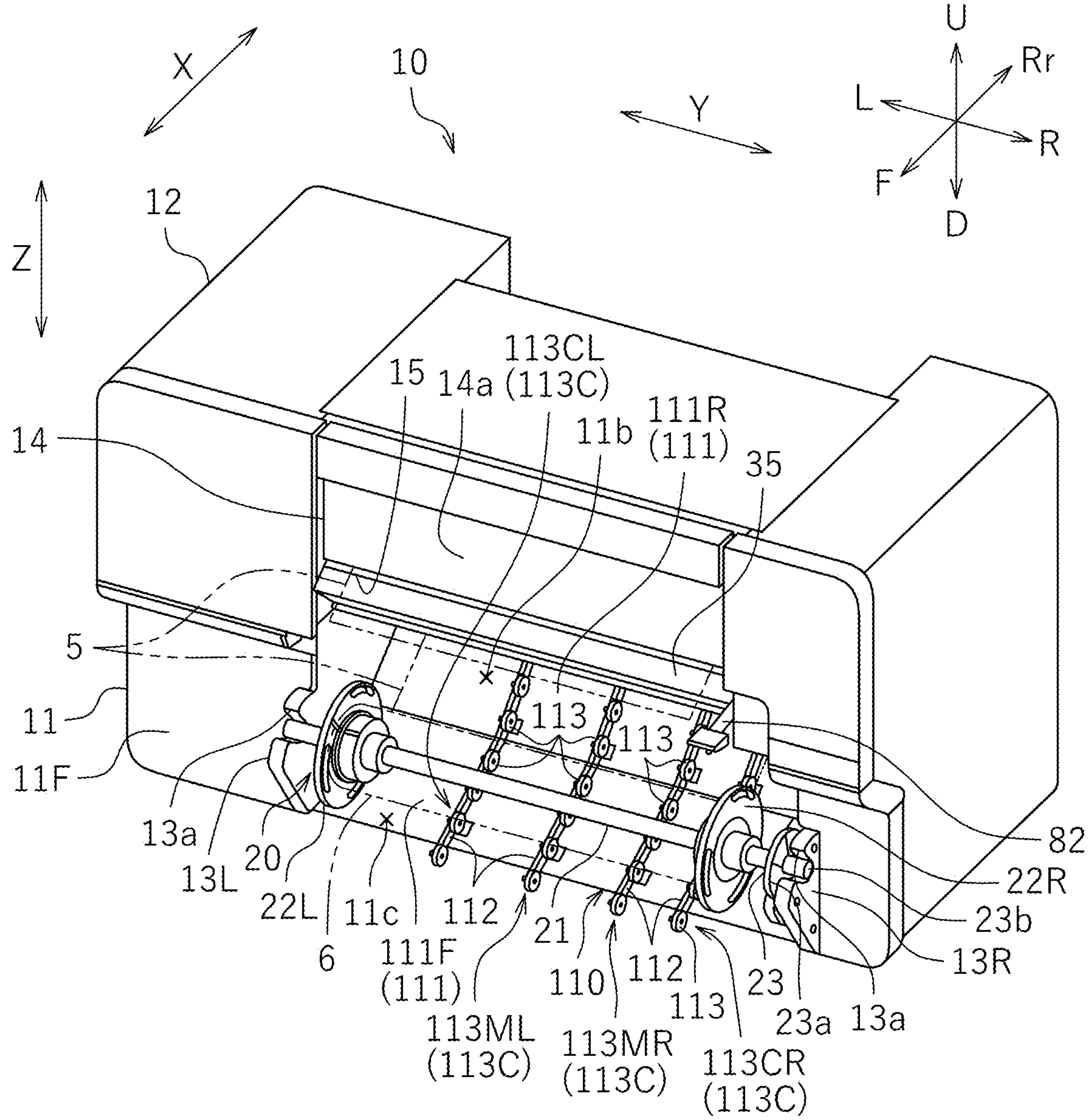
FIG. 1 is a perspective view showing a printer according to one example embodiment of the present invention.
Figure 2:
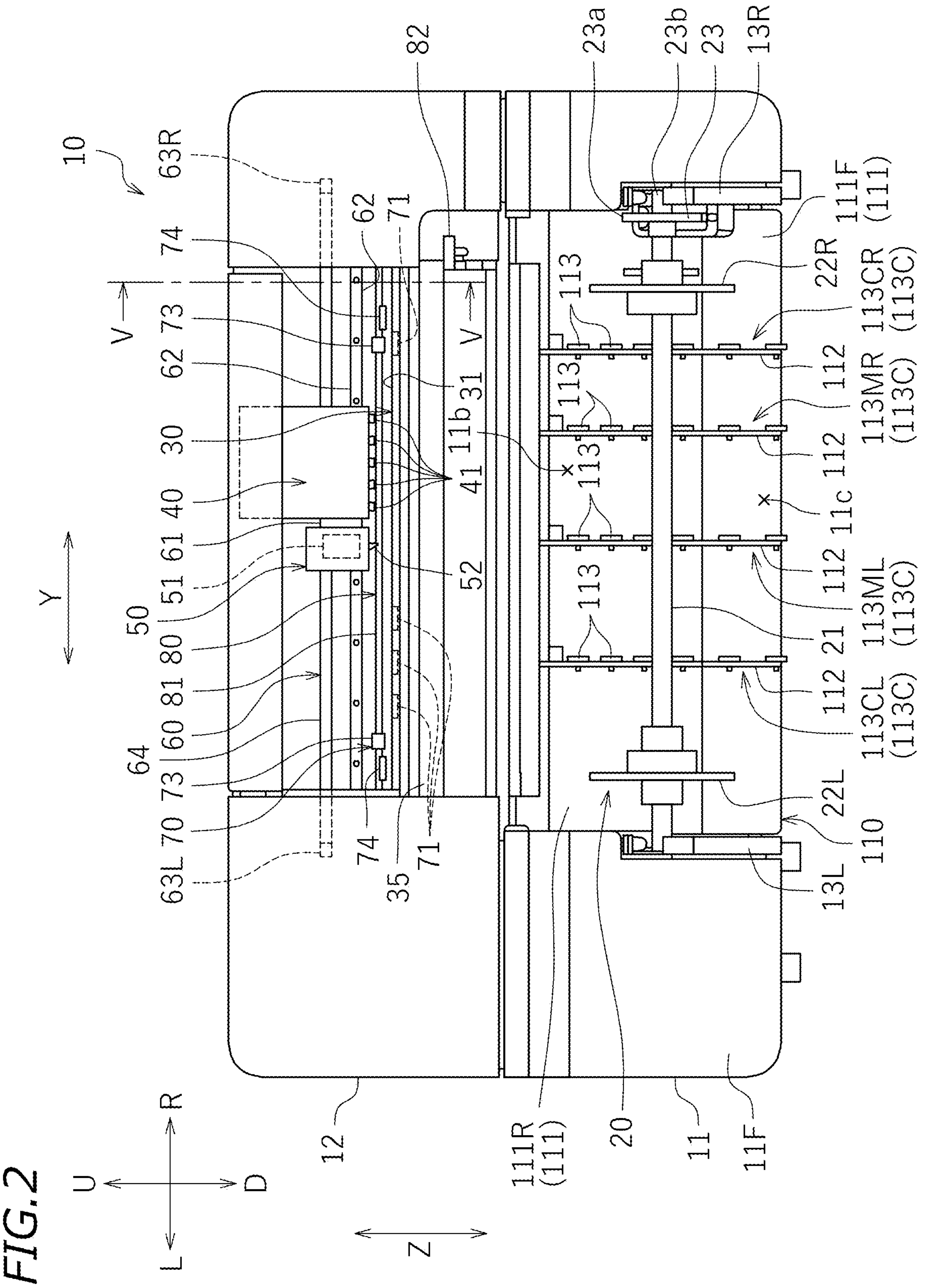
FIG. 2 is a front view showing the printer.

FIG. 1 is a perspective view showing the printer 10 according to one example embodiment. FIG. 2 is a front view showing the printer 10. In the present specification, the surface of the printer 10 from which the printed or cut recording medium 5 is ejected is referred to as the front surface of the printer 10. As shown in FIG. 1, the front surface of the printer 10 has an outlet 15, through which the printed or cut recording medium 5 is ejected. In the following description, the direction of the printer 10 as seen from the user at the front of the printer 10 is referred to as rearward, and the opposite direction is referred to as forward. In the following description, left, right, up, and down are used to mean these directions as viewed from the user at the front side of the printer 10. The designations F, Rr, L, R, U and D, as used in the figures, refer to front, rear, left, right, up and down, respectively. The designation Y in the figures denotes the primary scanning direction. In the present example embodiment, the primary scanning direction Y is the left-right direction. The designation X in the figures denotes the secondary scanning direction. In the present example embodiment, the secondary scanning direction X is the front-rear direction. The designation Z in the figures denotes the up-down direction. The primary scanning direction Y, the secondary scanning direction X and the up-down direction Z are orthogonal to each other. Note however that these designations of direction are used herein for the purpose of illustration, and should not be construed as being restrictive.

The recording medium 5 is recording paper, for example. Note however that the recording medium 5 is not limited to recording paper. For example, the recording medium 5 may be a sheet made of a resin material such as PVC or polyester, or a sticker sheet consisting of a backing paper and a release paper layered on the backing paper and coated with an adhesive. In the present example embodiment, the recording medium 5 is wound into a roll to form a medium roll 6. The printer 10 is capable of printing and cutting the recording medium 5 drawn from the medium roll 6. Note however that the printer 10 is also capable of printing and cutting an unwound recording medium 5, e.g., a piece of the recording medium 5. There is no particular limitation on the recording medium 5 as long as it is a sheet medium that can be wound.

Figure 3:
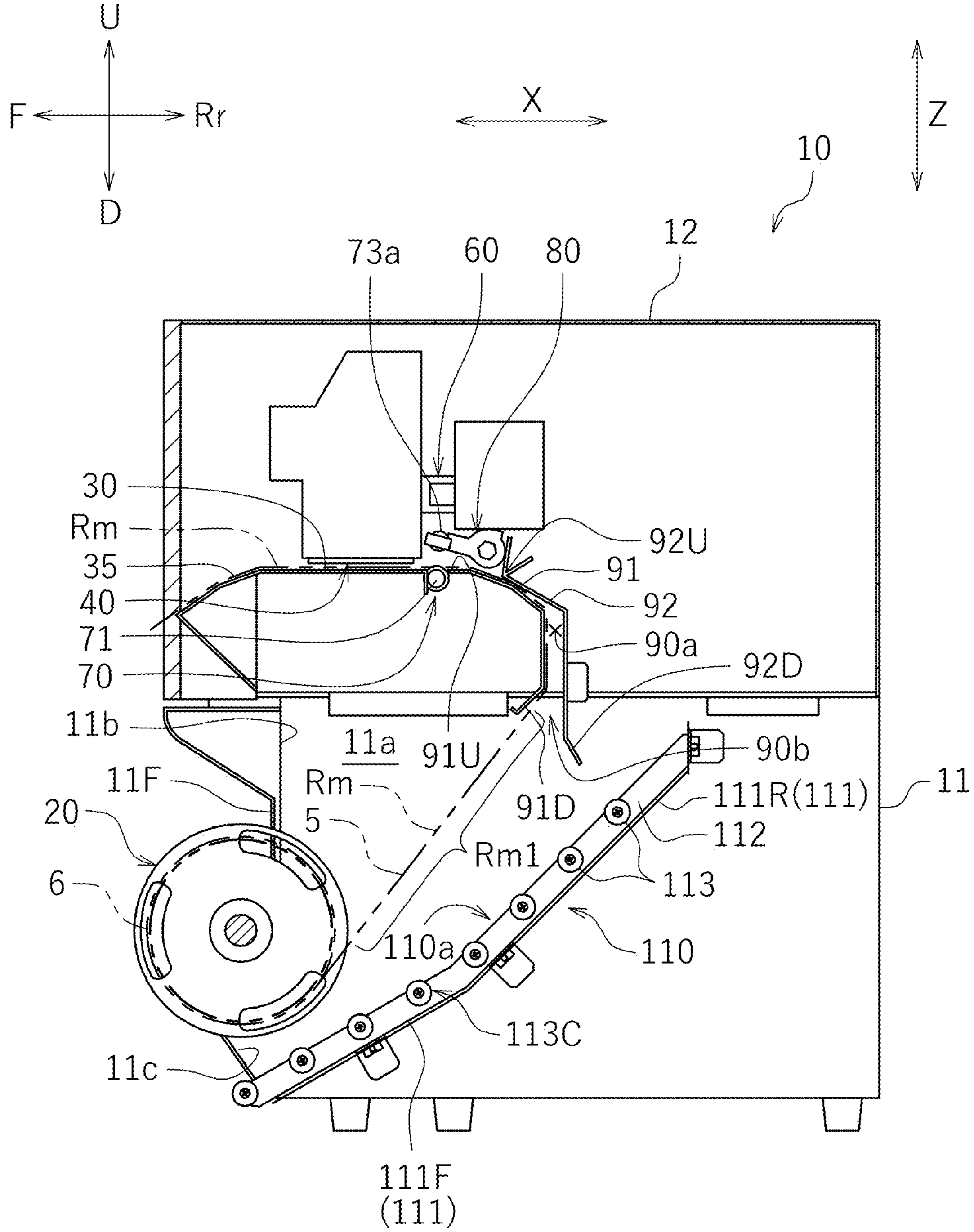
FIG. 3 is a vertical sectional view showing the printer.

As shown in FIG. 1, the printer 10 includes a housing portion 11 for the recording medium 5, which forms the lower portion of the printer 10, and a printer body 12, in which mechanisms for printing and cutting the recording medium 5 are integrated and which defines the upper portion of the printer 10. FIG. 3 is a vertical sectional view showing the printer 10. As shown in FIG. 3, the housing portion 11 has an internal space 11*a*. The internal space 11*a* houses a portion of the roll holder 20 that supports the medium roll 6, and a pull-back apron 110, which will be described later. As shown in FIG. 2 and FIG. 3, the printer body 12 includes a platen 30, a front apron 35 connected to the front of the platen 30 and guiding the recording medium 5 to the outlet 15, a print head 40, a cutting head 50, a head moving device 60 that moves a print head 40 and the cutting head 50 in the primary scanning direction Y, and a conveyor 70 that transfers the recording medium 5 drawn from the medium roll 6.

As shown in FIG. 3, the printer body 12 includes a guide passage 90*a* through which the recording medium 5 drawn from the medium roll 6 passes before reaching the platen 30. The printer body 12 includes a rear apron 91 and a guide apron 92 that, as a pair, define the guide passage 90*a*. The housing portion 11 supports the printer body 12 from below, which includes the platen 30, the front apron 35, the print head 40, the cutting head 50, the head moving device 60, the conveyor 70, the rear apron 91, and the guide apron 92.

The roll holder 20 supports the medium roll 6 so that the medium roll 6 can rotate in the front-rear direction. As shown in FIG. 3, the roll holder 20 is located at the front end portion of the housing portion 11. In the present example embodiment, providing the roll holder 20, which supports the medium roll 6, at the front end portion of the printer 10, enhances the convenience when replacing the medium roll 6. The roll holder 20 is arranged downward relative to the platen 30. The housing portion 11 is preferably configured to house at least a portion of the roll holder 20, and may house the entirety of the roll holder 20. Here, the housing portion 11 houses a rear portion of the roll holder 20.

As shown in FIG. 2, the roll holder 20 includes a shaft portion 21, a left flange portion 22L, a right flange portion 22R, and a positioning flange 23. The shaft portion 21 is formed in a cylindrical shape. A hollow core of the medium roll 6 is inserted over the shaft portion 21. The left flange portion 22L is attached near the left end of the shaft portion 21. The left flange portion 22L is formed in a disc shape with a larger diameter than the shaft portion 21. The left flange portion 22L regulates the movement of the medium roll 6 to the left. The left flange portion 22L is removable from the shaft portion 21. By inserting the medium roll 6 over the shaft portion 21 with the left flange portion 22L removed, and then attaching the left flange portion 22L to the shaft portion 21, the medium roll 6 is attached to the roll holder 20.

The right flange portion 22R is connected to the right end of the shaft portion 21. The right flange portion 22R is formed in a disc shape having a larger diameter than the shaft portion 21. The right flange portion 22R regulates the movement of the medium roll 6 to the right. The positioning flange 23 is arranged further to the right of the right flange portion 22R. The positioning flange 23 includes a disc-shaped flange portion 23*a* that determines the position in the primary scanning direction Y when the roll holder 20 is attached to the printer 10, and a cylindrical tip portion 23*b* attached to the printer 10. The tip portion 23*b* is provided further to the right of the flange portion 23*a*.

As shown in FIG. 1, the housing portion 11 is provided with a pair of mounting members 13R, 13L to which the roll holder 20 is mounted. The pair of mounting members 13R, 13L are provided so as to protrude from a front surface 11F of the housing portion 11. The pair of mounting members 13R, 13L include a recess portion 13*a* that is open on the top. The tip portion 23*b* of the positioning flange 23 is dropped into the recess portion 13*a* of the right mounting member 13R. The left end portion of the shaft portion 21 is dropped into the recess portion 13*a* of the left mounting member 13L. The pair of mounting members 13R, 13L support the roll holder 20 so that the roll holder 20 can rotate in the front-rear direction. As a result, the medium roll 6 is mounted on the printer 10 rotatably in the front-rear direction.

As shown in FIG. 3, a portion of the front surface 11F of the housing portion 11 that is upward relative to the roll holder 20 is provided with an upper opening 11*b* that is large enough to allow the user to pass their hand through. The user grasps an end portion in the longitudinal direction of the recording medium 5 drawn from the medium roll 6 by hand and inserts the recording medium 5 into the guide passage 90*a*. The medium insertion slot 90*b*, which is the inlet into the guide passage 90*a*, is open downward in a space rearward relative to the roll holder 20 in the interior space 11*a* of the housing portion 11. Therefore, the front surface 11F of the housing portion 11 is provided with an upper opening 11*b* that allows the user to put their hand inside the housing portion 11.

The platen 30 is provided upward relative to the roll holder 20. The platen 30 supports the recording medium 5 having been drawn from the medium roll 6 and having arrived via the guide passage 90*a*. While the details of the guide passage 90*a* will be described below, as shown in FIG. 3, the transfer path Rm of the recording medium 5 is configured to extend from the roll holder 20 to the platen 30 via the medium insertion slot 90*b* and the guide passage 90*a*. The transfer path Rm is a transfer path of the recording medium 5 extending from the roll holder 20 to the platen 30 along which the recording medium 5 is drawn from the medium roll 6 and transferred. Note that the guide passage 90*a* is bent forward in the middle portion. Hereinafter, the direction in which the recording medium 5 travels in the guide passage 90*a* will also be referred to as the insertion direction D1 (see FIG. 5). The insertion direction D1 varies depending on the position in the guide passage 90*a*. The platen 30 is provided downstream in the insertion direction D1 relative to the guide passage 90*a* (the rear apron 91 and the guide apron 92). Here, the platen 30 is arranged forward relative to an upper end 91U of the rear apron 91 and an upper end 92U of the guide apron 92.

The platen 30 extends in the primary scanning direction Y and the secondary scanning direction X. As shown in FIG. 2, the upper surface of the platen 30 defines a base surface 31 on which the recording medium 5 is placed. The print head 40 and the cutting head 50 are provided upward of the platen 30. Printing and cutting of the recording medium 5 are performed on the platen 30. As shown in FIG. 2, the print head 40 and the cutting head 50 are opposing the base surface 31 of the platen 30. The head moving device 60 includes a carriage 61 that holds the print head 40 and the cutting head 50 and moves in the primary scanning direction Y.

The head moving device 60 moves the carriage 61 in the primary scanning direction Y, thereby moving the print head 40 and the cutting head 50 in the primary scanning direction Y. As shown in FIG. 2, the head moving device 60 includes a guide rail 62, left and right pulleys 63L and 63R, a belt 64, and a carriage motor 65 (see FIG. 11). The guide rail 62 is provided upward of the platen 30. The guide rail 62 extends in the primary scanning direction Y. The left pulley 63L is provided at the left end of the guide rail 62. The right pulley 63R is provided at the right end of the guide rail 62. The belt 64 is wound around the pulley 63L and the pulley 63R. The belt 64 is fixed to the back surface of the carriage 61. The carriage motor 65 is connected to one of the pulleys 63L and 63R. When the carriage motor 65 is driven to rotate the pulley 63L or 63R, the belt 64 runs between the pulleys 63L and 63R. This causes the carriage 61 to move in the primary scanning direction Y. The print head 40 and the cutting head 50 move in the primary scanning direction Y together with the carriage 61.

The print head 40 prints on the recording medium 5 supported by the platen 30. The print head 40 is provided upward relative to the platen 30 so as to oppose the platen 30. The print head 40 includes a plurality of ink heads 41 each having a plurality of nozzles (not shown) that eject ink. The plurality of ink heads 41 eject ink of different colors, e.g., yellow ink, magenta ink, cyan ink, black ink, and white ink. Note however that there is no particular limitation on the number of ink heads 41 and the colors of ink to be ejected from the ink heads 41.

The cutting head 50 cuts the recording medium 5 placed on the platen 30. The cutting head 50 is provided upward of the platen 30 so as to oppose the platen 30. The cutting head 50 includes a solenoid 51 and a cutter 52 capable of cutting the recording medium 5. The cutter 52 is attached to the solenoid 51. As the solenoid 51 is turned ON/OFF, the cutter 52 moves in the up-down direction to contact the recording medium 5 or to move away from the recording medium 5. By moving the carriage 61 in the primary scanning direction Y and moving the recording medium 5 in the secondary scanning direction X while the cutter 52 is in contact with the recording medium 5, the recording medium 5 is cut by the cutter 52.

Figure 5:
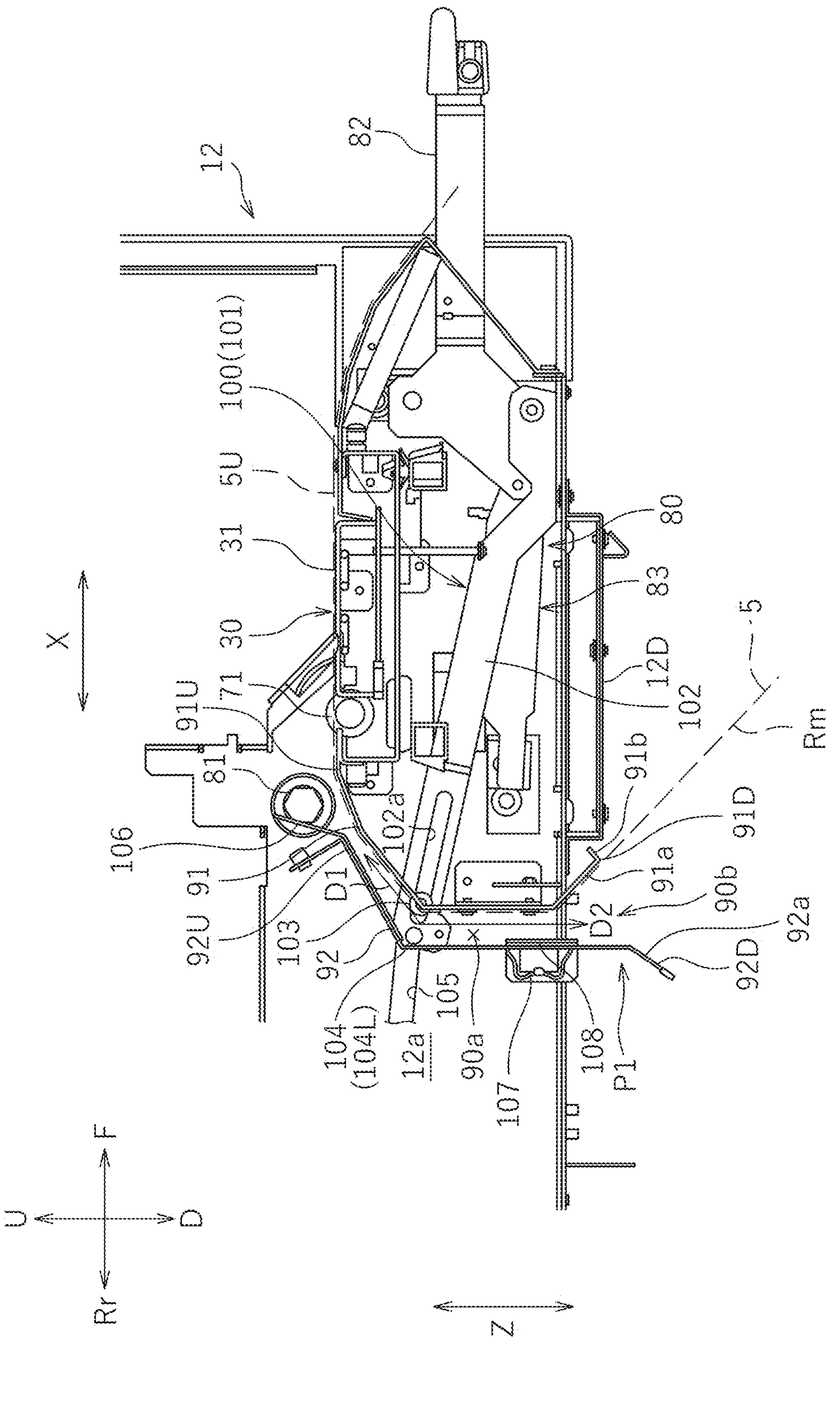
FIG. 5 is a sectional view showing a vicinity of a guide passage and a platen, where the guide passage is in a closed state.

The conveyor 70 transfers the recording medium 5 on the platen 30 in the secondary scanning direction X. The conveyor 70 transfers the recording medium 5 forward on the platen 30 to draw the recording medium 5 from the medium roll 6. The conveyor 70 transfers the recording medium 5 rearward on the platen 30, thereby pulling the recording medium 5 back toward the roll holder 20. When cutting the printed recording medium 5, the printer 10 performs an operation of pulling back the printed recording medium 5 on the platen 30. As shown in FIG. 5, when the conveyor 70 feeds the recording medium 5 forward on the platen 30, the recording medium 5 is fed downstream in the insertion direction D1 through the guide passage 90*a*. When the conveyor 70 feeds the recording medium 5 rearward on the platen 30, the recording medium 5 is fed upstream in the insertion direction D1 (hereinafter referred to also as the pull-back direction D2) through the guide passage 90*a*, i.e., the recording medium 5 is pulled back.

The conveyor 70 includes a plurality of grit rollers 71, a feed motor 72 (see FIG. 11), left and right pinch roller units 73, left and right medium clamps 74, and an elevator 80 that moves the pinch roller units 73 and the medium clamps 74 in the up-down direction.

As shown in FIG. 2, a plurality of grit rollers 71 are provided on the platen 30. The plurality of grit rollers 71 are embedded in the platen 30 so that upper end portions thereof are exposed. The plurality of grit rollers 71 rotate in the front-rear direction under the driving force of the feed motor 72. The plurality of grit rollers 71 are aligned in the primary scanning direction Y.

The right pinch roller unit 73, of the left and right pinch roller units 73, is arranged upward of the rightmost grit roller 71. The left pinch roller unit 73 is capable of sliding in the primary scanning direction Y so that the left pinch roller unit 73 can move upward of any of a grit rollers 71 other than the rightmost grit roller 71. By moving the left pinch roller unit 73 in the primary scanning direction Y, the position of the pinch roller unit 73 in the primary scanning direction Y can be aligned with the width of the recording medium 5. The right medium clamp 74 is arranged rightward of the rightmost pinch roller unit 73. The left medium clamp 74 is capable of sliding in the primary scanning direction Y so that the left medium clamp 74 is aligned with the width of the recording medium 5 and can hold the left end of the recording medium 5.

Figure 4:
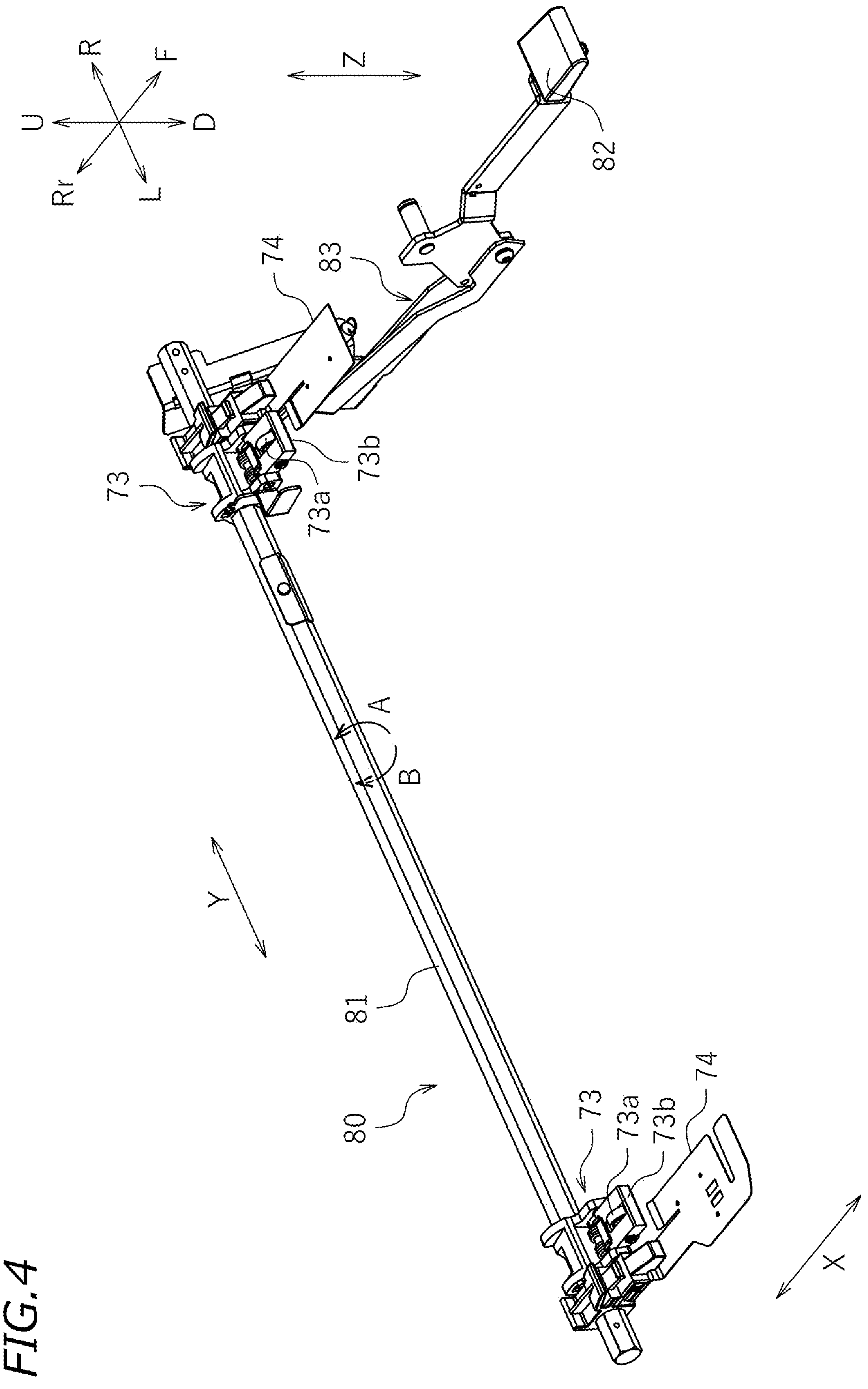
FIG. 4 is a perspective view showing an elevator.

FIG. 4 is a perspective view showing the elevator 80 of the pinch roller units 73 and the medium clamps 74. As shown in FIG. 4, the elevator 80 includes a shaft 81, a loading lever 82, and an elevation link mechanism 83. The shaft 81 extends in the primary scanning direction Y. The shaft 81 is arranged upward relative to the platen 30. In the present example embodiment, the shaft 81 is configured to have a hexagonal cross section. As shown in FIG. 4, a pair of pinch roller units 73 and a pair of medium clamps 74 are inserted over the shaft 81. The left pinch roller unit 73 and the left medium clamp 74 are capable of sliding in the primary scanning direction Y along the shaft 81.

As shown in FIG. 4, the pinch roller units 73 each include a pinch roller 73*a* and a holder 73*b*. The holders 73*b* support the pinch rollers 73*a* so that the pinch rollers 73*a* can rotate in the front-rear direction. The pinch rollers 73*a* are arranged upward of the platen 30 so as to oppose the grit rollers 71 and can rotate in the front-rear direction. The holders 73*b* are non-rotatably inserted over the shaft 81.

The medium clamps 74 are formed in a flat plate shape. The left and right medium clamps 74 hold the left end and the right end, respectively, of the recording medium 5 on the platen 30 to prevent the recording medium 5 from lifting off the platen 30. The medium clamps 74 are non-rotatably inserted over the shaft 81.

The elevator 80 moves the pinch rollers 73*a* and the medium clamps 74 in the up-down direction. In the present example embodiment, the elevator 80 pivots the pinch rollers 73*a* and the medium clamps 74 about the axis of the shaft 81, thereby moving the pinch rollers 73*a* and the medium clamps 74 in the up-down direction. The shaft 81 is linked to the loading lever 82 via the elevation link mechanism 83. As shown in FIG. 1, the loading lever 82 is provided so as to project forward past the front surface of the printer body 12. This allows the user to operate the loading lever 82 from the front side of the printer 10. By operating the loading lever 82, it is possible to move the pinch roller 73*a* and the medium clamps 74 in the up-down direction.

Specifically, when the loading lever 82 is pushed upward, the rotation of the loading lever 82 is transmitted to the shaft 81 via the elevating link mechanism 83, and the shaft 81 rotates in the direction of the arrow A in FIG. 4. With the rotation of the shaft 81 in the direction A, the pinch roller units 73 and the medium clamps 74 pivot upward. As a result, the pinch roller units 73 and medium clamps 74 move upward relative to the grit rollers 71. When the loading lever 82 is pushed downward, the shaft 81 rotates in the direction of the arrow B in FIG. 4. With the rotation of the shaft 81 in the direction B, the pinch roller units 73 and the medium clamps 74 pivot downward. As a result, the pinch roller units 73 come close to the grit rollers 71 so that the recording medium 5 can be pinched between the pinch roller units 73 and the grit rollers 71. The medium clamps 74 also come close to the platen 30 so that the recording medium 5 can be pinched between the medium clamps 74 and the platen 30.

Hereinafter, the position of the pinch rollers 73*a* away from the grit rollers 71 will be referred to also as the release position. The position of the pinch rollers 73*a* such that the recording medium 5 can be pinched between the pinch rollers 73*a* and the grit rollers 71 will be referred to also as the pinch position. The elevator 80 moves the pinch rollers 73*a* between the release position and the pinch position. The elevator 80 holds the pinch rollers 73*a* in the release position and in the pinch position. As the feed motor 72 is driven to rotate the grit rollers 71, with the recording medium 5 pinched between the grit rollers 71 and the pinch rollers 73*a*, the recording medium 5 is transferred in the secondary scanning direction X. Note that for the medium clamps 74, the position spaced away from the platen 30 will be referred to also as the release position, and the position such that the recording medium 5 can be pinched between the medium clamps 74 and the platen 30 will be referred to also as the pinch position.

As shown in FIG. 3, the rear apron 91 and the guide apron 92 are arranged so as to oppose each other in the front-rear direction, thereby defining the guide passage 90*a* therebetween through which the recording medium 5 is inserted. The rear apron 91 is arranged rearward and upward relative to the roll holder 20. The rear apron 91 is arranged rearward and downward relative to the platen 30. The rear apron 91 guides the recording medium 5 to the platen 30. The guide apron 92 is arranged rearward of the rear apron 91 so as to oppose the rear apron 91, defining the guide passage 90*a* therebetween through which the recording medium 5 drawn from the medium roll 6 is inserted. With the guide apron 92 arranged rearward of the rear apron 91, the surface of the recording medium 5 that faces the print head 40 (the upper surface on the platen 30 and referred to also as a print surface 50; see FIG. 5) opposes the guide apron 92 in the guide passage 90*a*.

FIG. 5 is a sectional view showing the vicinity of the guide passage 90*a* and the platen 30. FIG. 5 is a vertical sectional view cut in a vertical plane passing near the loading lever 82 (see section line V-V in FIG. 2). As shown in FIG. 5, the rear apron 91 extends in the up-down direction. Specifically, a lower portion of the rear apron 91 extends substantially vertically and an upper portion thereof is sloping upward while extending forward. The rear apron 91 is bent forward in the middle portion. The rear apron 91 is bent so that the upper end 91U is located forward relative to the lower end 91D. The guide apron 92 also extends in the up-down direction. Specifically, a lower portion of the guide apron 92 extends substantially vertically and an upper portion thereof is sloped to extend forward and upward. The guide apron 92 is bent forward in the middle portion. Like the rear apron 91, the guide apron 92 is also bent so that the upper end 920 is located forward relative to the lower end 92D. The rear apron 91 and the guide apron 92 form the guide passage 90*a* that extends in the up-down direction while being bent forward in the middle portion. Although not shown in the figures, the rear apron 91 and the guide apron 92 extend in the primary scanning direction Y. The rear apron 91 and the guide apron 92 are arranged in alignment with the roll holder 20 for the primary scanning direction Y. The platen 30 is arranged in alignment with the rear apron 91 and the guide apron 92 for the primary scanning direction Y.

The lower end portion 91D of the rear apron 91 and the lower end portion 92D of the guide apron 92 define the medium insertion slot 90*b* through which the recording medium 5 is inserted into the guide passage 90*a*. The medium insertion slot 90*b* is located rearward relative to the roll holder 20 and the platen 30 and upward relative to the roll holder 20. The transfer path Rm (see FIG. 3) of the recording medium 5 is formed to extend from the roll holder 20 to the platen 30 via the medium insertion slot 90*b* and the guide passage 90*a*. The transfer path Rm is the path of the recording medium 5 when the recording medium 5 is transferred in the insertion direction D1 (downstream), at which time the recording medium 5 is under tension. As described in detail below, when the recording medium 5 is transferred in the pull-back direction D2, the recording medium 5 becomes slack so that a portion of the recording medium 5 sags from the transfer path Rm.

As shown in FIG. 5, the rear apron 91 includes a forward sloping portion 91*a* formed at the lower end 91D and sloping downward while extending forward. The rear apron 91 extends substantially vertically to a predetermined position near the bottom portion of the printer body 12, with a portion thereof downward of that position bent forward. The forwardly bent portion forms the forward sloping portion 91*a* that slopes downward and extends forward. As shown in FIG. 5, the tip portion of the forward sloping portion 91*a* is bent upward. The upwardly bent portion forms a tip sloping portion 91*b*. The rear apron 91 is arranged upward relative to a lowermost portion 12D of the bottom surface of the printer body 12 that is forward of the medium insertion slot 90*b* (hereinafter also referred to simply as the lowermost portion 12D). The tip sloping portion 91*b* is bent upward so that the rear apron 91 is located upward relative to the lowermost portion 12D of the printer body 12 and so as to reduce the gap in the front-rear direction between the tip sloping portion 91*b* and the lowermost portion 12D.

The guide apron 92 extends downward relative to the rear apron 91. The guide apron 92 includes a rearward sloping portion 92*a* formed at the lower end portion 92D and sloping downward while extending rearward. The guide apron 92 extends substantially vertically to a predetermined position that is downward relative to the lowermost portion of the rear apron 91, with a portion thereof downward of that position bent rearward. The rearwardly bent portion forms the rearward sloping portion 92*a*. The rearward sloping portion 92*a* is located downward relative to the forward sloping portion 91*a*. The guide apron 92 is arranged downward relative to the lowermost portion 12D of the printer body 12. Here, the rearward sloping portion 92*a* is entirely located downward relative to the lowermost portion 12D of the printer body 12.

As described in detail below, in the present example embodiment, the guide apron 92 moves (pivots) in the front-rear direction. The arrangement of the guide apron 92 illustrated in FIG. 5 and described above is the arrangement when the guide apron 92 is positioned most forward and downward. Hereinafter, the position of the guide apron 92 at this time will be referred to also as the closed position P1. The state in which the guide apron 92 is in the closed position P1 will hereinafter be referred to also as the guide passage 90*a* or the guide apron 92 being in the closed state. The position of the guide apron 92 when the guide apron 92 moves most rearward and upward and the interval between the rear apron 91 and the guide apron 92 is widened (see FIG. 7) will be referred to also as the open position P2. The open position P2 is set rearward relative to the closed position P1. The state in which the guide apron 92 is in the open position P2 will hereinafter be referred to also as the guide passage 90*a* or the guide apron 92 being in the open state.

Figure 6:
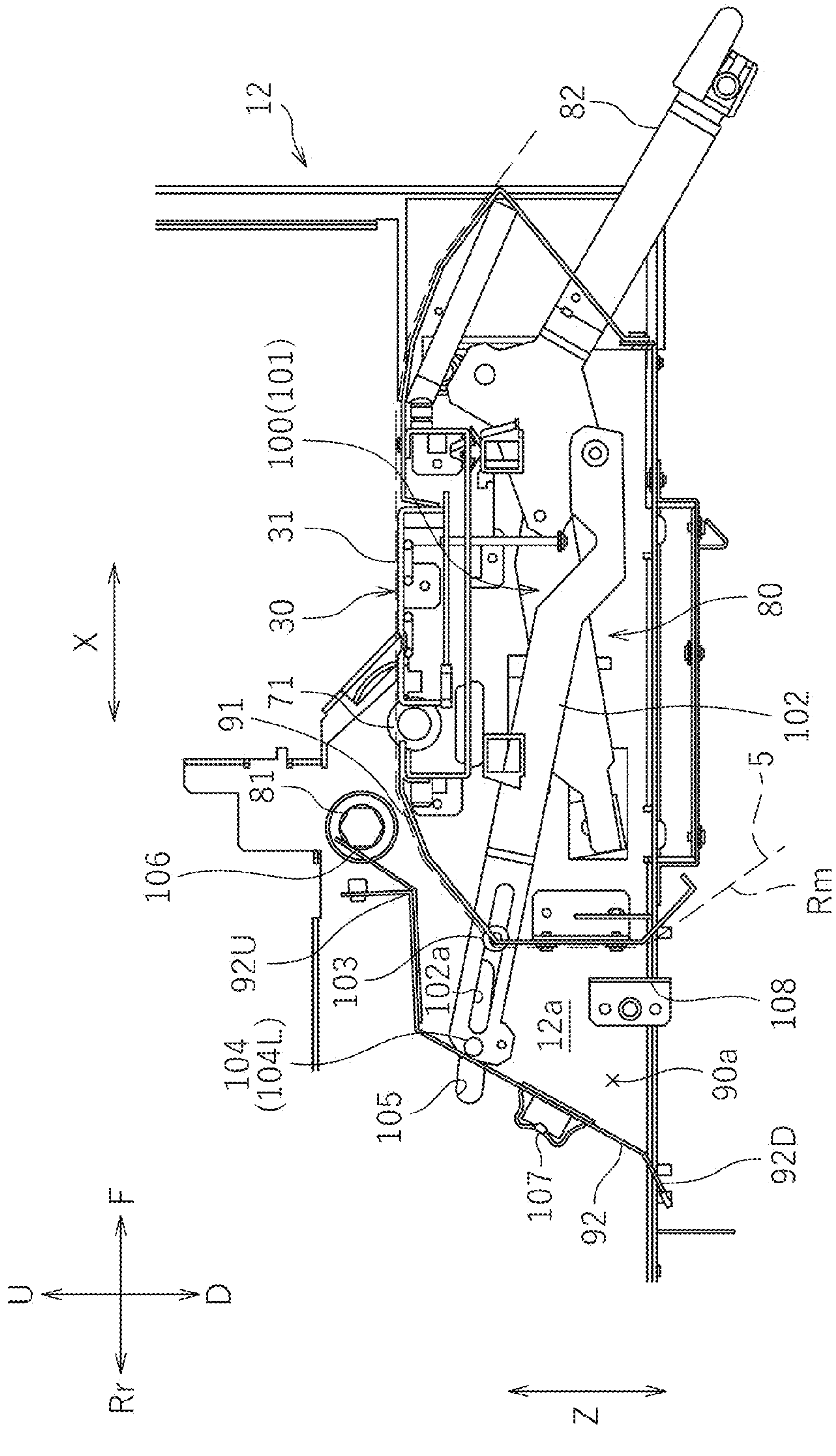
FIG. 6 is a sectional view showing the vicinity of the guide passage and the platen, where the guide passage is in an intermediate state between the closed state and an open state.
Figure 7:
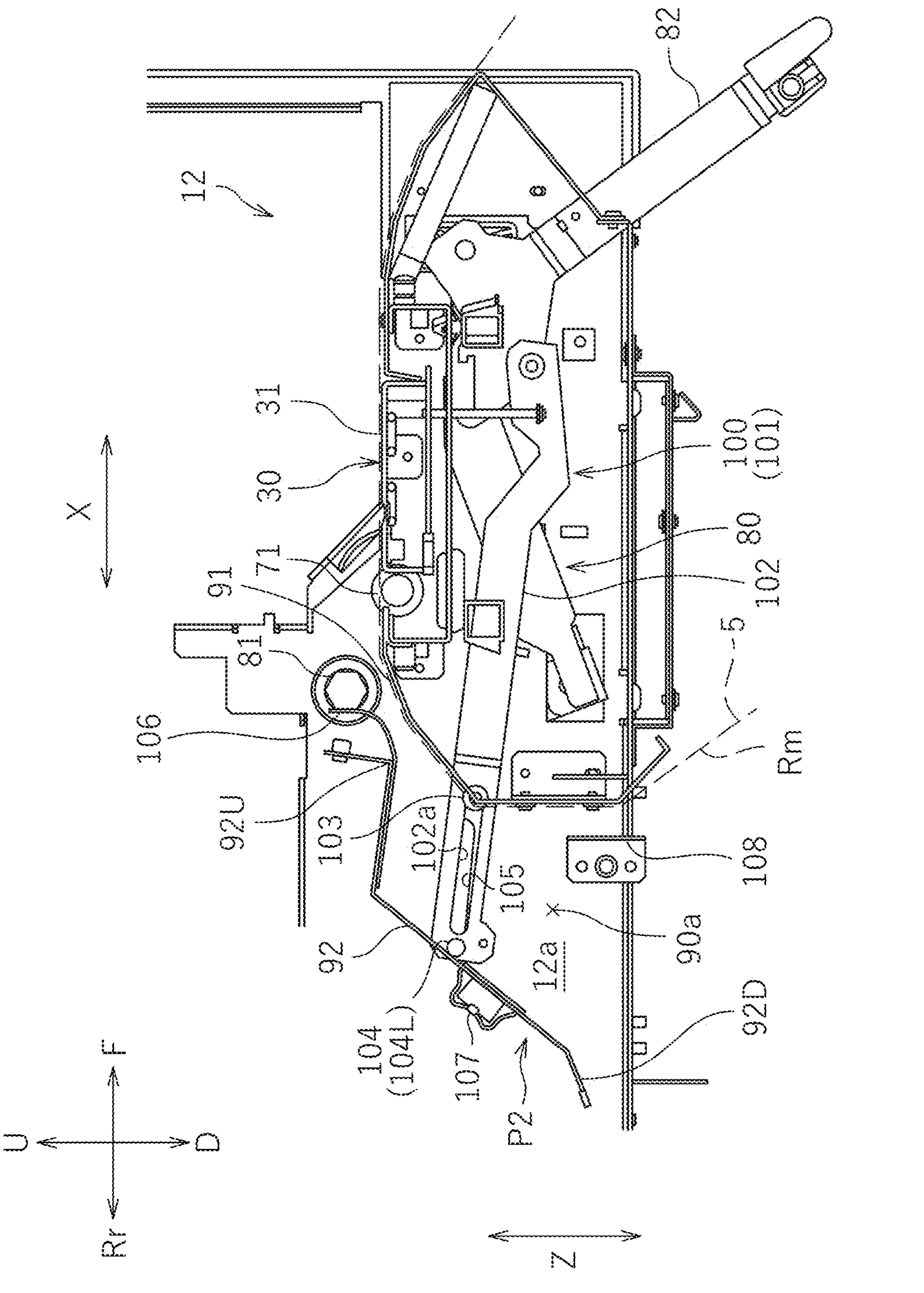
FIG. 7 is a sectional view showing the vicinity of the guide passage and the platen, where the guide passage is in the open state.

FIG. 6 is a sectional view showing the vicinity of the guide passage 90*a* and the platen 30, where the guide passage 90*a* is in an intermediate state between the closed state and the open state. FIG. 7 is a sectional view showing the vicinity of the guide passage 90*a* and the platen 30 when the guide passage 90*a* is in the open state. As shown in FIG. 5 to FIG. 7, the printer 10 includes an apron moving mechanism 100 connected to the loading lever 82. The apron moving mechanism 100 moves the guide apron 92 to the closed position P1 and to the open position P2, and holds the guide apron 92 in the closed position P1 and in the open position P2, thereby realizing the closed state where the interval between the rear apron 91 and the guide apron 92 is narrow, and the open state where the interval between the rear apron 91 and the guide apron 92 is wider than in the closed state. Specifically, the apron moving mechanism 100 realizes the closed state by holding the guide apron 92 in the closed position P1, and the open state by holding the guide apron 92 in the open position P2, which is rearward relative to the closed position P1.

In the present example embodiment, the apron moving mechanism 100 is interlocked with the elevator 80, and when the pinch rollers 73*a* are moved to the release position by the elevator 80, the guide apron 92 is moved to the closed position P1. The apron moving mechanism 100 moves the guide apron 92 to the open position P2 when the pinch rollers 73*a* are moved to the pinch position. Here, the apron moving mechanism 100 moves the guide apron 92 to the closed position P1 when the loading lever 82 is pulled up, and moves the guide apron 92 to the open position P2 when the loading lever 82 is pushed down. In the state where the recording medium 5 is not held by the pinch rollers 73*a*, the guide passage 90*a* is in the closed state. In the state where the recording medium 5 is held by the pinch rollers 73*a*, the guide passage 90*a* is in the open state. As shown in FIG. 5, the apron moving mechanism 100 includes an open/close link mechanism 101 linked to the loading lever 82 and the guide apron 92.

As shown in FIG. 5, the open/close link mechanism 101 includes a link bar 102, a guide shaft 103, a push-up shaft 104, a guide hole 105, a closure plate 106, a magnet 107, and an adhering plate 108. The link bar 102 is a plate-shaped link member configured to be capable of pivoting relative to the loading lever 82. The front end portion of the link bar 102 is rotatably linked to the loading lever 82. The link bar 102 extends rearward. The link bar 102 lifts and moves the guide apron 92 by the rear portion. A slide hole 102*a* is formed in the rear portion of the link bar 102, running through in the primary scanning direction Y. The slide hole 102*a* is a long hole extending in the direction of extension of the link bar 102 (here, generally the front-rear direction). The guide shaft 103 extends in the primary scanning direction Y and is inserted through the slide hole 102*a*. The guide shaft 103 is fixed to an inner wall 12*a* of the printer body 12, which is located rightward of the loading lever 82. With the guide shaft 103 inserted through the slide hole 102*a*, the movement of the link bar 102 is regulated such that the slide hole 102*a* passes through the location of the guide shaft 103.

The push-up shaft 104 is located at the rear end portion of the link bar 102. The push-up shaft 104 extends leftward from the left side surface of the link bar 102, and rightward from the right side surface of the link bar 102 (a portion of the push-up shaft 104 that protrudes on the right side surface of the link bar 102 is not shown). The guide hole 105 has an opening in the inner wall 12*a* of the printer body 12. The portion of the push-up shaft 104 that protrudes on the right side surface of the link bar 102 is inserted into the guide hole 105. The guide hole 105 is a long hole formed to be sloping upward while extending rearward. With the push-up shaft 104 inserted into the guide hole 105, the movement of the link bar 102 is also regulated such that the push-up shaft 104 moves along the guide hole 105. As shown in FIG. 6 and FIG. 7, when the loading lever 82 is pushed down, the push-up shaft 104 moves rearward and upward along the direction of extension of the guide hole 105.

A portion 104L of the push-up shaft 104 that protrudes on the left side surface of the link bar 102 (also referred to as the push-up shaft 104L) is in contact with the front surface of the guide apron 92 (the surface opposing the rear apron 91). The push-up shaft 104L supports the guide apron 92. The push-up shaft 104L is not fixed to the guide apron 92. Without the support of the push-up shaft 104L, the guide apron 92 is in the closed position P1. By being pushed up by the push-up shaft 104L, which moves rearward and upward as the loading lever 82 is pushed down, the guide apron 92 pivots rearward (upward). As shown in FIG. 6 and FIG. 7, the guide apron 92 contacts the push-up shaft 104L while moving to the open position P2, and the position where the guide apron 92 contacts the push-up shaft 104L slides gradually toward the lower end 92D. As shown in FIG. 7, as the loading lever 82 is pushed downward all the way, the guide apron 92 moves to the open position P2. As a result, the guide passage 90*a* is set to the open state, where it is wider than in the closed state. At this time, the pinch rollers 73*a* and the medium clamps 74 have moved to the pinch position.

The closure plate 106 has its rear end fixed to the guide apron 92, and a portion that is forward relative to the rear end is in contact with the shaft 81. The rear end of the closure plate 106 is fixed to the upper end portion 92U (the front end portion) of the guide apron 92. As shown in FIG. 5, the shaft 81 is arranged forward relative to the guide apron 92 and spaced away from the guide apron 92. The guide apron 92 is spaced away from the shaft 81 so that the guide apron 92 can be moved by the apron moving mechanism 100. A gap is provided between the guide apron 92 and the shaft 81. The closure plate 106 extends from the upper end portion 920 of the guide apron 92 toward the shaft 81 of the elevator 80. The closure plate 106 extends in a diagonal forward-upward direction from the upper end portion 92U of the guide apron 92. The closure plate 106 extends in the primary scanning direction Y so as to span the full width of the guide apron 92. The closure plate 106 is flexible. The closure plate 106 is in contact with the shaft 81 due to its elasticity. The closure plate 106 is formed, for example, of a flexible resin. Note however that there is no particular limitation on the material of the closure plate 106 as long as it is flexible. The closure plate 106 may be, for example, a thin metal plate.

As shown in FIG. 5 to FIG. 7, the closure plate 106 closes the gap between the guide apron 92 and the shaft 81 when the guide apron 92 is in the closed position P1, when it is the open position P2, and when it is the intermediate position between the closed position P1 and the open position P2 (i.e., at all times). Such closure is made possible by the flexibility of the closure plate 106. Such closure of the gap prevents incorrect insertion of the recording medium 5 into the gap between the guide apron 92 and the shaft 81. Note that the member arranged near the guide apron 92 and apart from the guide apron 92 so as to allow movement of the guide apron 92 is not limited to the shaft 81. The shaft 81 is merely one example of such a member.

The magnet 107 is fixed to the guide apron 92. The magnet 107 is fixed to a portion of the guide apron 92 that extends substantially vertically when the guide apron 92 is in the closed position P1 (the portion upward of the rearward sloping portion 92*a*). The magnet 107 is fixed to the back surface of the guide apron 92. Note however that the magnet 107 may be fixed to the front surface of the guide apron 92 as long as the magnet 107 does not interfere with the insertion of the recording medium 5 into the guide passage 90*a*.

The adhering plate 108, which adheres to the magnet 107, is fixed to the inner wall 12*a* of the printer body 12. The adhering plate 108 contains a magnetic metal, e.g., iron. The adhering plate 108 is arranged in a position adjacent to the magnet 107 when the guide apron 92 is in the closed position P1. The adhering plate 108 is arranged in a position opposing the magnet 107 in the front-rear direction when the guide apron 92 is in the closed position P1. The adhesion between the magnet 107 and the adhering plate 108 firmly holds the guide apron 92 in the closed position P1 when the loading lever 82 is pulled up. The adhesion force between the magnet 107 and the adhering plate 108 should preferably be such that the guide apron 92 does not move from the closed position P1 even when the user pushes the guide apron 92 rearward with the recording medium 5. When the loading lever 82 is pushed down, the guide apron 92 moves from the closed position P1 against the adhesion force between the magnet 107 and the adhering plate 108.

The adhering plate 108 may be fixed to the guide apron 92. In that case, the magnet 107 may be provided in a position corresponding to the adhering plate 108. For the first adhering portion fixed to the guide apron 92 and the second adhering portion arranged in a position adjacent to the first adhering portion when the guide apron 92 is in the closed position P1, one of them may contain a magnet and the other may contain a magnetic metal. Alternatively, the first adhering portion and the second adhering portion do not need to be a combination of a magnet and a magnetic material. For example, the first adhering portion and the second adhering portion may be configured such that one of them sucks air. The member holding the guide apron 92 in the closed position P1 may not be an adhering portion and it may be a hook, or the like, for example. However, a mechanism for holding the guide apron 92 in the closed position P1 can be easily configured by using a combination of a magnet and a magnetic material. Note that if the weight of the guide apron 92 itself is sufficient to hold the guide apron 92 in the closed position P1, there may be no mechanism for holding the guide apron 92 in the closed position P1.

Figure 12:
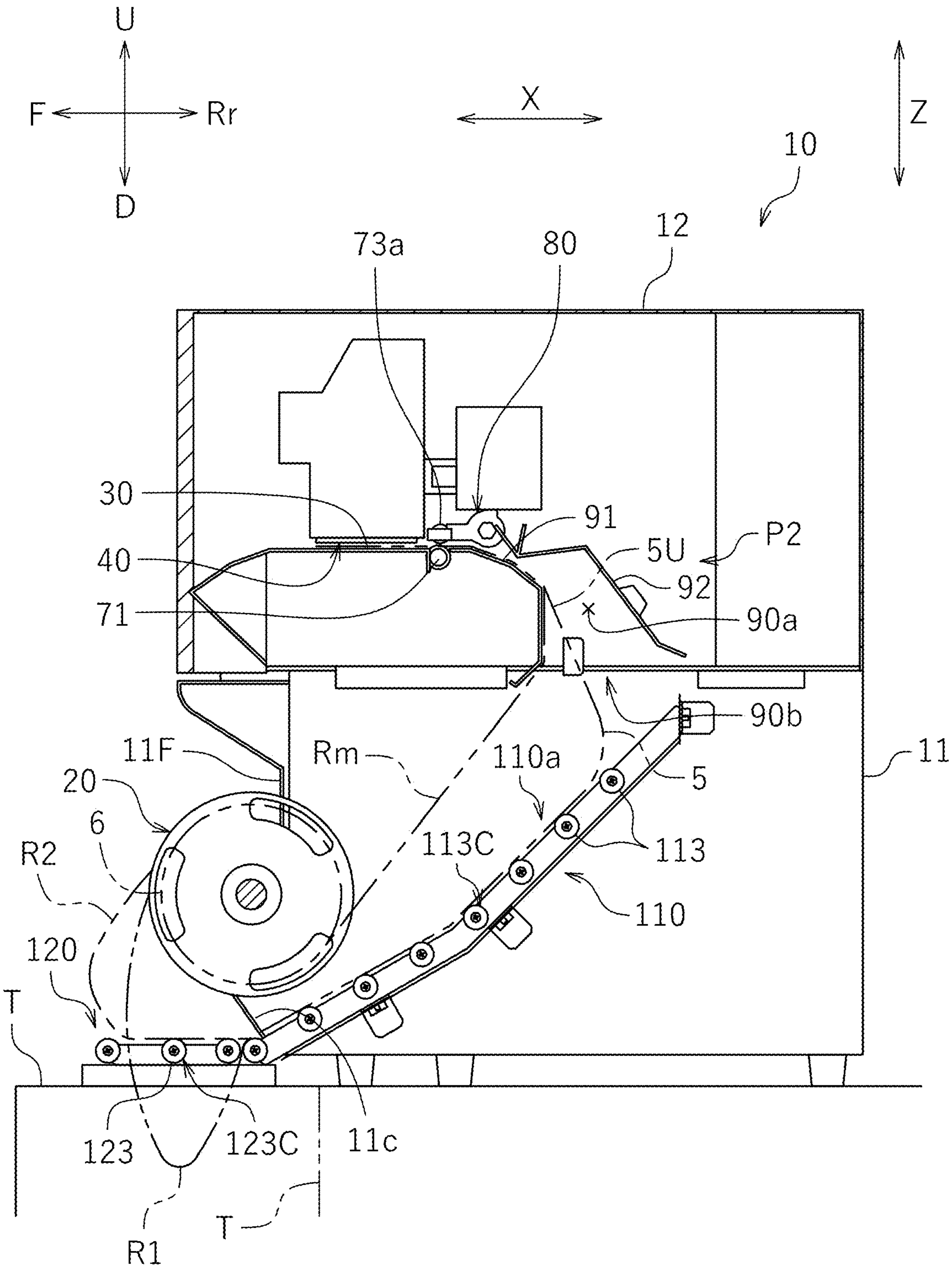
FIG. 12 is a vertical sectional view of the printer schematically showing a state of a recording medium during a pull-back operation.

As shown in FIG. 3, the pull-back apron 110 is a member configured to be capable of receiving the recording medium 5 that is pulled back toward the roll holder 20, and receives the recording medium 5 so that the recording medium 5 sagging due to the pull-back operation is prevented from being jammed. The pull-back apron 110 is housed in the housing portion 11. The pull-back apron 110 is provided, with a predetermined interval from the transfer path Rm, downward of the transfer path Rm of the recording medium 5, more specifically, downward of a portion of the transfer path Rm that is between the roll holder 20 and the medium insertion slot 90*b* (hereinafter referred to also as a portion Rm1 that is inside the housing portion 11). The pull-back apron 110 includes a receiving portion 110*a* provided so as to oppose the medium insertion slot 90*b*. The receiving portion 110*a* slopes downward and extends forward. The receiving portion 110*a* extends to a position rearward relative to the medium insertion slot 90*b*. Due to the curl or stiffness of the recording medium 5, the recording medium 5 that is pulled back may sag to be inclined to a position rearward relative to a position directly below the medium insertion slot 90*b*. To be able to receive such a sagging recording medium 5, the receiving portion 110*a* extends to a position rearward relative to the medium insertion slot 90*b* even when the guide apron 92 is moved to the open position P2. As shown in FIG. 12, the receiving portion 110*a* extends downward of the guide apron 92 in the open position P2. The recording medium 5 may be pulled back toward the rear side during the pull-back operation, in which case the recording medium 5 will change its direction forward along the guide apron 92, i.e., the recording medium 5 will move along the guide apron 92. Therefore, the receiving portion 110*a* extends to a position downward of the guide apron 92 in the open position P2.

As shown in FIG. 1, the receiving portion 110*a* includes an inclined plate 111 and a plurality of roller supports 112 provided on the inclined plate 111. The plurality of roller supports 112 each support one roller row 113C. Each roller row 113C includes a plurality of rollers 113 aligned in the front-rear direction.

As shown in FIG. 3, the inclined plate 111 is formed in a flat plate shape and slopes downward and extends forward. The inclined plate 111 is bent in the central portion in the front-rear direction. The inclination angle of a rear portion 111R of the inclined plate 111 that is rearward of the bent portion is greater than that of a front portion 111F thereof. As shown in FIG. 3, the rear portion 111R is located directly below the medium insertion slot 90*b*. With such a configuration, the recording medium 5 coming down from the medium insertion slot 90B lands on the rollers 113 on the rear portion 111R. Since the rear portion 111R has a large inclination angle, by dropping the recording medium 5 on the rear portion 111R, the recording medium 5 can be more reliably guided forward. The front portion 111F has a smaller inclination angle than the rear portion 111R so that the height of the housing portion 11 can be reduced.

As shown in FIG. 1, a plurality of roller supports 112 each extend in a diagonal forward-downward direction along the inclined plate 111 and are aligned in the left-right direction (the primary scanning direction Y). Each roller support 112 is a plate-shaped member whose thickness direction is the left-right direction. The plurality of roller supports 112 include four roller supports 112 arranged in alignment in the left-right direction. In each roller row 113C, six rollers 113 are aligned in the front-rear direction along the downward slope of the pull-back apron 110 and are each capable of rotating in the front-rear direction. The rollers 113 are an example of rollers that can rotate in the front-rear direction. The rollers are not limited to the rollers 113, but may be freely rotatable balls, for example. The rollers 113 rotate as the recording medium 5 that is being pulled back moves, and prevents the print surface 5U of the recording medium 5 from being rubbed.

A plurality of roller rows 113C are aligned in the left-right direction. Preferably, three or more roller rows 113C are provided. In the present example embodiment, four roller rows 113C are provided, for example. Note however that there is no particular limitation on the number of roller rows 113C. In the following, when it is necessary to distinguish between multiple roller rows 113C, the leftmost roller row 113C will be referred to as the roller row 113CL, the second roller row 113C from the left as the roller row 113ML, the third roller row 113C from the left as the roller row 113MR, and the rightmost roller row 113C as the roller row 113CR. In the present example embodiment, the four roller rows 113CL to 113CR are configured similarly. Note however that the four roller rows 113CL to 113CR may differ from each other, for example, in terms of the number of rollers 113.

The four roller rows 113CL to 113CR are provided so as to correspond to the width of the recording medium 5 in the primary scanning direction Y. The recording medium 5 with the narrowest width in the primary scanning direction Y is supported by some roller rows 113C including the rightmost roller row 113CR (e.g., the rightmost roller row 113CR and the second roller row 113MR from the right). The recording medium 5 with the widest width in the primary scanning direction Y is supported by the four roller rows 113CL to 113CR. The number of roller rows 113C is determined appropriately and there is no particular limitation thereto.

Note that the roller support 112 supporting the rollers 113 of the second roller row 113MR from the right may be configured to be movable in the primary scanning direction Y. The pull-back apron 110 may be configured to be able to accommodate various widths of the recording medium 5 by allowing the rollers 113 of the roller row 113MR to move in the primary scanning direction Y. In such a case, the roller row 113C may be two roller rows 113CR and 113MR. Note however that as the distance between the roller rows 113CR and 113MR increases, the recording medium 5 sags therebetween and is more likely to come into contact with the inclined plate 111. Therefore, other roller rows 113C movable in the primary scanning direction Y may be further provided. Alternatively, the rollers 113 may be elongated in the primary scanning direction Y. The pull-back apron 110 may include one or more roller rows 113C each having a plurality of such elongated rollers 113 aligned along the downward slope of the pull-back apron 110.

Figure 8:
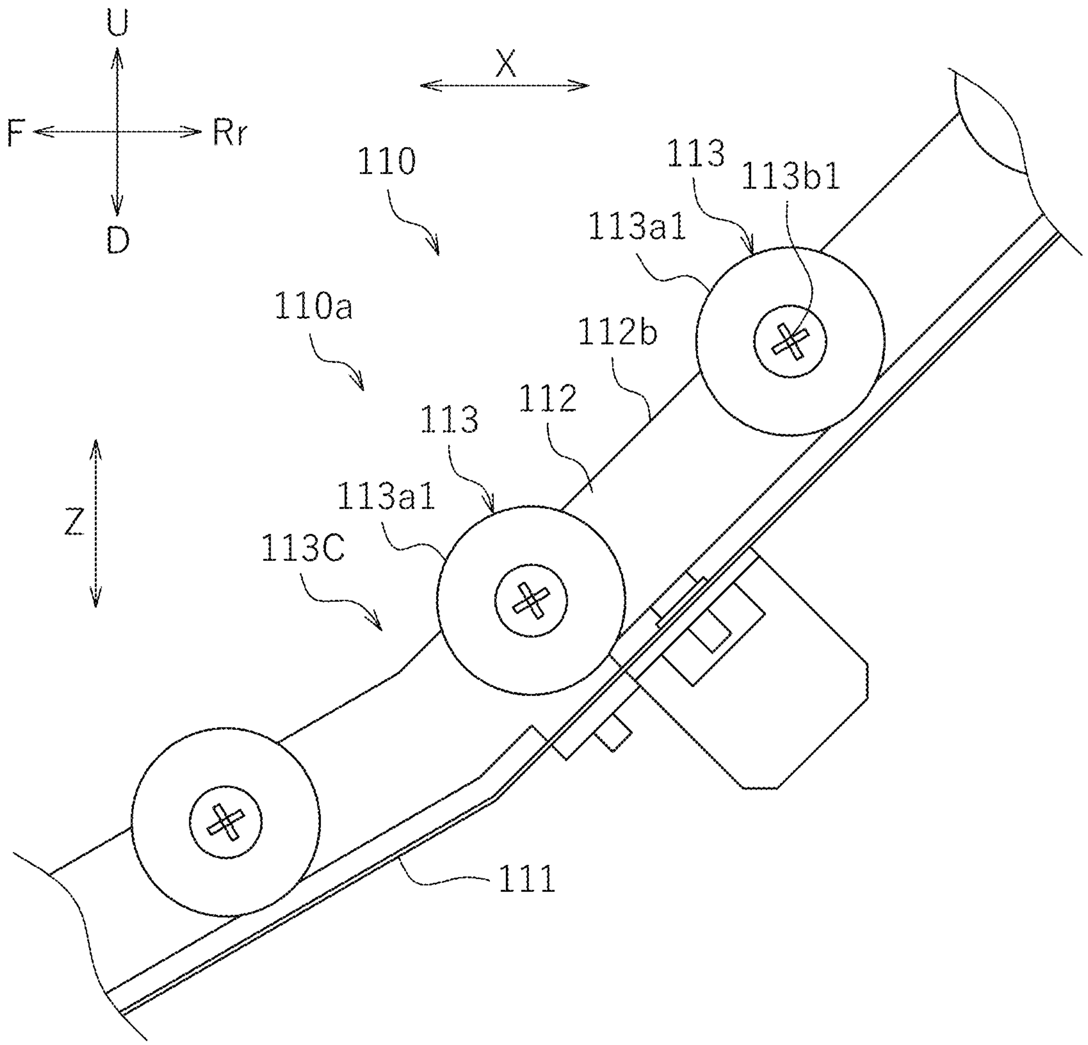
FIG. 8 is a right side view showing a pull-back apron.
Figure 9:
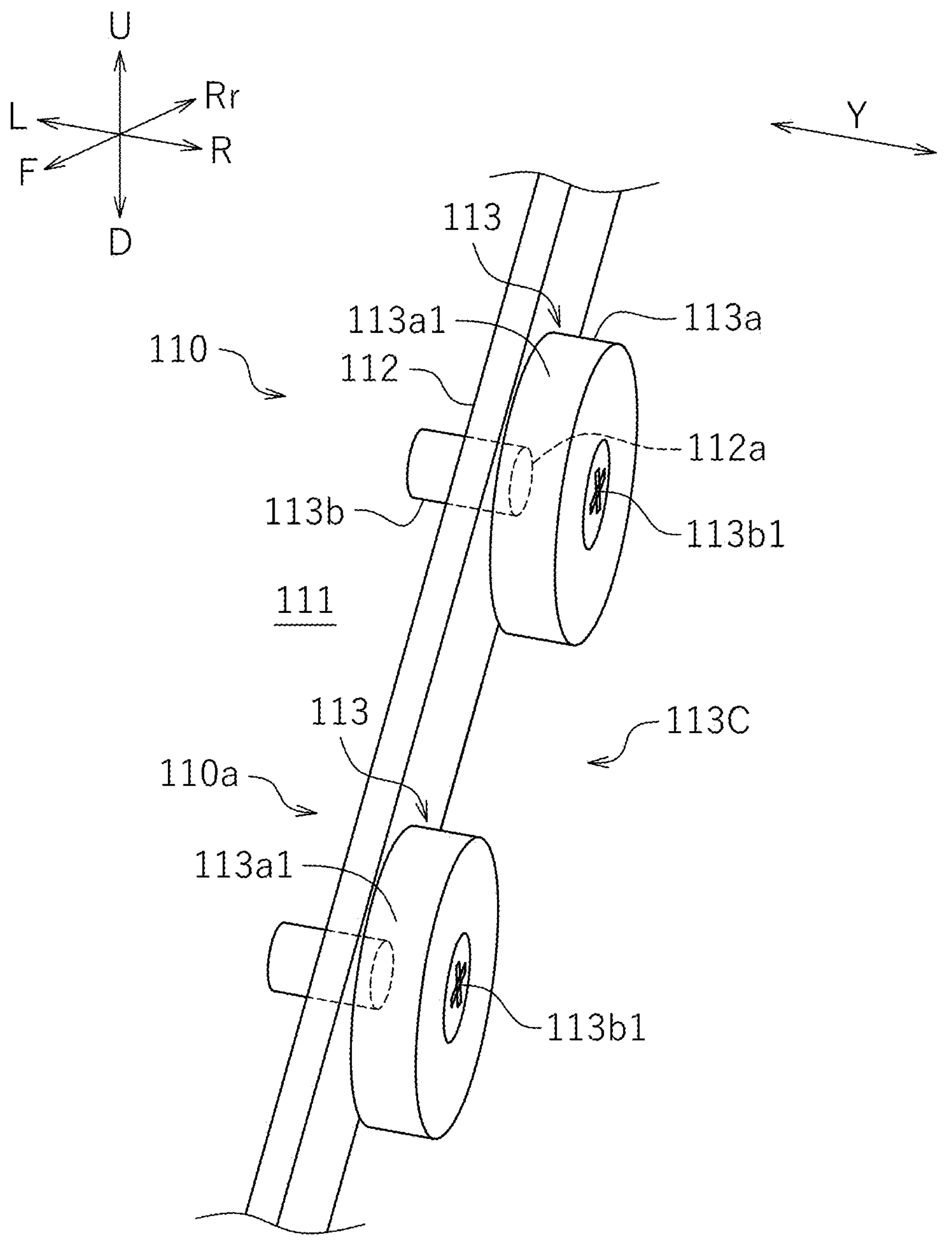
FIG. 9 is a perspective view showing rollers.

FIG. 8 is a right side view showing a portion of the pull-back apron 110 on an enlarged scale. FIG. 9 is a perspective view showing the rollers 113. As shown in FIG. 9, each roller 113 includes a roller portion 113*a* and a shaft portion 113*b*. The roller portion 113*a* and the shaft portion 113*b* are formed in a disc shape and a cylindrical shape, respectively. The diameter of the roller portion 113*a* is larger than that of the shaft portion 113*b*. The roller portion 113*a* is configured to rotate about the shaft portion 113*b*. The shaft portion 113*b* is inserted into an insertion hole 112*a*, running through the roller support 112 in the left-right direction, and is fixed to the insertion hole 112*a*. The roller portion 113*a* is arranged on the side (here, on the right) of the roller support 112.

As shown in FIG. 8, the roller support 112 is arranged on the upper surface of the inclined plate 111. An upper surface 112*b* of the roller support 112 slopes downward and extends forward. A medium-supporting surface 113*a*1 of each roller 113 (i.e., a portion of each roller 113 that supports the recording medium 5) protrudes upward relative to the upper surface 112*b* of the roller support 112. A center of rotation 113*b*1 of each roller 113 is located downward relative to the upper surface 112*b* of the roller support 112. As the medium-supporting surface 113*a*1 of each roller 113 is configured to protrude upward relative to the upper surface 112*b* of the roller support 112, the recording medium 5 can be supported by a plurality of rollers 113. As the center of rotation 113*b*1 of each roller 113 is configured to be located downward relative to the upper surface 112*b* of the roller support 112, it is possible to realize smooth transfer of the recording medium 5.

If the center of rotation 113*b*1 of the roller 113 is located upward relative to the upper surface 112*b* of the roller support 112, the recording medium 5 transferred on the roller 113 may pass downward relative to the center of rotation 113*b*1 of the roller 113. Downward relative to the center of rotation 113*b*1, when the lower end (the front end in the transfer direction) of the recording medium 5 hits the medium-supporting surface 113*a*1 of the roller 113, the recording medium 5 will cause the roller 113 to rotate in the direction opposite to the transfer direction. As a result, the recording medium 5 slips into the gap between the medium-supporting surface 113*a*1 of the roller 113 and the roller support 112. If the recording medium 5 slips into the gap, the transfer of the recording medium 5 is stopped and it is not possible to realize smooth transfer of the recording medium 5. In contrast, where the center of rotation 113*b*1 of each roller 113 supported by the roller support 112 is located downward relative to the upper surface 112*b* of the roller support 112, when the lower end (the front end in the transfer direction) of the recording medium 5 hits the medium-supporting surface 113*a*1 of the roller 113, the recording medium 5 will cause the rollers 113 to rotate in the transfer direction. Therefore, the recording medium 5 is transferred forward without slipping into the gap formed between the medium-supporting surface 113*a*1 of the roller 113 and the roller support 112. This allows smooth transfer of the recording medium 5.

Note that the mechanism for supporting the rollers 113 (or other rollers such as balls) is not limited to the above. For example, the rollers 113 may be embedded in the roller supports 112 so that their portions upward relative to the center of rotation 113*b*1 are exposed. For example, the inclined plate 111 and the roller support 112 may be formed as a single component. The rollers 113 may, for example, be embedded in the inclined plate 111 as the roller support so that their upper end portions are exposed.

As shown in FIG. 1, in the present example embodiment, the rollers 113 are provided at the frontmost end of the receiving portion 110*a*. This prevents the recording medium 5 from contacting any portion other than the rollers 113 forward relative to the frontmost rollers 113.

As shown in FIG. 3, the front end of the receiving portion 110*a* is located downward relative to the roll holder 20. The pull-back apron 110 extends so as to pass downward of the roll holder 20. A gap 11*c* is provided between the front end of the receiving portion 110*a* and the roll holder 20 such that the recording medium 5 can pass through the gap 11*c* with the medium roll 6 mounted on the roll holder 20. The gap 11*c* is configured so that the recording medium 5 can pass through even when the medium roll 6 with the largest diameter is mounted on the roll holder 20. The gap 11*c* is a gap for inserting the recording medium 5 drawn from the medium roll 6 into the housing portion 11. The gap 11*c* may also allow the pulled-back recording medium 5 to be brought out of the housing portion 11. The recording medium 5, which has been slackened from the transfer path Rm due to the pull-back operation, travels forward along the slope of the receiving portion 110*a* and, depending on the distance of pull-back, exits from the gap 11*c* to the outside of the housing portion 11 (see FIG. 12). The gap 11*c* is to allow the pulled-back recording medium 5 to exit the housing portion 11. The height of the gap 11*c* is preferably 30 mm or more. In the present example embodiment, the pull-back apron 110 is connected to the front surface 11F of the housing portion 11 and is not, or is hardly, protruding to the outside of the housing portion 11. Note however that the pull-back apron 110 may be protruding to the outside of the housing portion 11.

The printer 10 according to the present example embodiment is configured so that an auxiliary apron 120 (see FIG. 10) can be attached to the outside of the housing portion 11 so as to be continuous with the pull-back apron 110. The auxiliary apron 120 and the pull-back apron 110 form a receiver capable of receiving the recording medium 5 pulled back toward the roll holder 20. The auxiliary apron 120 is an extended receiver connected to the front end of the receiving portion 110*a* and extending forward. The auxiliary apron 120 differs here from the receiving portion 110*a* of the pull-back apron 110 in that an auxiliary apron 120 has an upper surface that is substantially horizontal. In the present example embodiment, the pull-back apron 110 and an auxiliary apron 120 are separate. However, the pull-back apron 110 and the auxiliary apron 120 may be formed as one unit.

Figure 10:
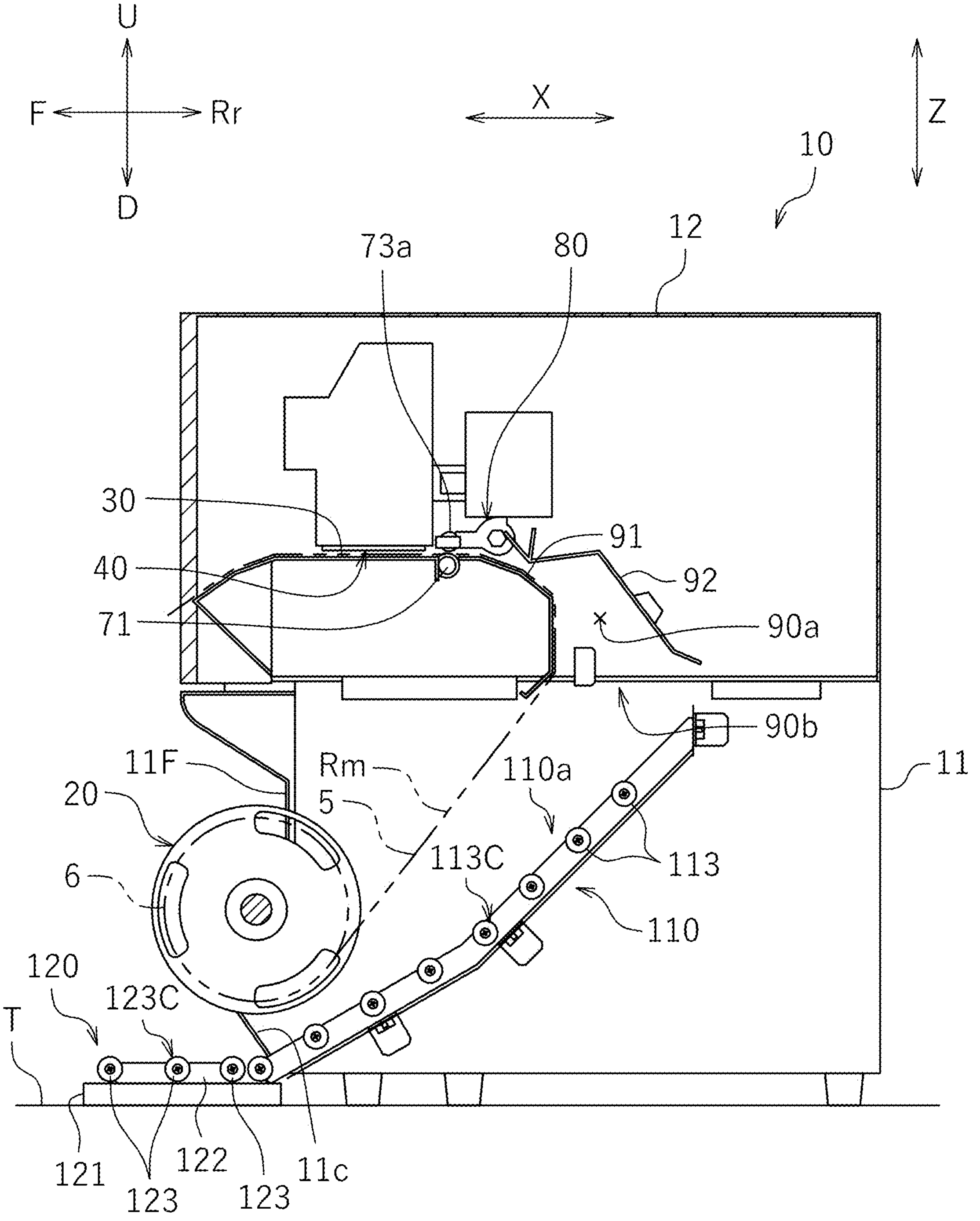
FIG. 10 is a right side view showing the printer with an auxiliary apron attached thereto.

FIG. 10 is a right side view showing the printer 10 with the auxiliary apron 120 attached thereto. The auxiliary apron 120 can be attached/detached to/from the pull-back apron 110 at a position corresponding to the front surface 11F of the housing portion 11. The auxiliary apron 120 is continuous with the front end of the pull-back apron 110 when attached to the pull-back apron 110. Note that the auxiliary apron 120 may be attached/detached to/from the housing portion 11, or the like. The configuration of the auxiliary apron 120 is similar to the pull-back apron 110. The auxiliary apron 120 includes a base plate 121 and a plurality of roller rows 123C (not shown, except for the rightmost roller row) arranged in alignment in the left-right direction. Each roller row 123C includes a plurality of rollers 123 aligned in the front-rear direction. The plurality of rollers 123 are each configured to be capable of rotating in the front-rear direction. The plurality of rollers 123 of each roller row 123C are supported by the roller support 122. Note that the configuration of the auxiliary apron 120 may be different from the pull-back apron 110. As will be described below, the auxiliary apron 120 may be removed from the housing portion 11 when not needed.

As shown in FIG. 1, a front cover 14 is provided on the front surface of the printer body 12. Here, the front cover 14 is supported by the printer body 12 so that the front cover 14 can rotate about its upper end as the axis. By rotating the front cover 14 upward, the internal space of the printer body 12 and the external space are connected together. A window 14*a* is provided in a lower portion of the front cover 14. The window 14*a* is formed, for example, by a transparent acrylic plate. The user can view the inside of the printer body 12 through the window 14*a*. The window 14*a* is treated to prevent ultraviolet rays from passing through the window 14*a*, for example.

Figure 11:
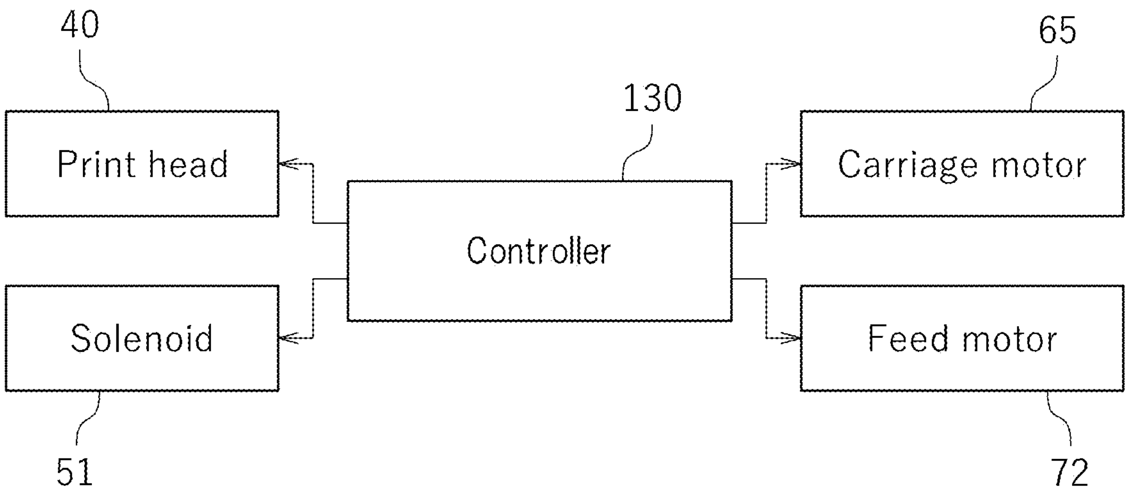
FIG. 11 is a block diagram of the printer.

FIG. 11 is a block diagram of the printer 10. As shown in FIG. 11, the printer 10 includes a controller 130. The controller 130 controls the printing on the recording medium 5 and the cutting of the recording medium 5. There is no particular limitation on the configuration of the controller 130. The controller 130 is, for example, a microcomputer. While there is no particular limitation on the hardware configuration of the controller 130, the controller 130 includes an I/F, a CPU, a ROM, a RAM, and a storage device, for example. The controller 130 is provided inside the printer body 12. Note however that the controller 130 does not need to be provided inside the printer body 12. For example, the controller 130 may be a computer, or the like, installed outside the printer body 12. In this case, the controller 130 is connected to the printer body 12 so that they can communicate via a wired or wireless connection.

As shown in FIG. 11, the controller 130 is connected to, and controls the operation of, the print head 40, the solenoid 51 of the cutting head 50, the carriage motor 65 of the head moving device 60, and the feed motor 72 of the conveyor 70. The controller 130 is configured or programmed to control the head moving device 60 and the conveyor 70 according to the print data so that the print head 40 moves in the primary scanning direction Y and the recording medium 5 is intermittently transferred downstream in the secondary scanning direction X. The controller 130 is configured or programmed to control the head moving device 60 and the conveyor 70 according to the cutting data so that the cutting head 50 moves in the primary scanning direction Y and the recording medium 5 is transferred forward or pulled back rearward on the platen 30. When cutting is performed after printing, the recording medium 5 is pulled back after printing, and cutting is started from the downstream side of the recording medium 5. With many cutting data, the recording medium 5 also moves downstream and upstream in the secondary scanning direction X.

The procedure for mounting the recording medium 5 in the printer 10 for printing and cutting will be described below with reference to FIG. 1, etc. When mounting the recording medium 5 in the printer 10, if the medium roll 6 is not mounted on the roll holder 20, the roll holder 20 is removed from the mounting members 13R, 13L. Next, the medium roll 6 is mounted on the roll holder 20, and the roll holder 20 is mounted on the mounting members 13R, 13L. It is assumed that the loading lever 82 is pulled up, and the pinch rollers 73*a* and the medium clamps 74 are in the release position. If the pinch rollers 73*a* and medium clamps 74 are not in the release position, the recording medium 5 cannot be fed to the grit rollers 71.

Then, the user inserts the longitudinal end portion of the recording medium 5 drawn from the medium roll 6 into the guide passage 90*a* through the medium insertion slot 90*b*. At this time, the user inserts the end portion of the recording medium 5 into the housing portion 11 through the gap 11*c* between the medium roll 6 and the pull-back apron 110. The user further inserts the end portion of the recording medium 5 into the medium insertion slot 90*b* by passing their hand through the upper opening 11*b* of the housing portion 11, and performs the operation of feeding the recording medium 5 onto the platen 30. In the present example embodiment, the guide apron 92 defines the rear wall of the guide passage 90*a* and extends to a position downward relative to the rear apron 91 defining the front wall. The user can insert the recording medium 5 into the medium insertion slot 90*b* without having to see the medium insertion slot 90*b*, by placing the end portion of the recording medium 5 against the front surface of the guide apron 92 and then feeding the recording medium 5 upward along the front surface of the guide apron 92. The printer 10 according to the present example embodiment is configured so that the recording medium 5 can easily be inserted into the medium insertion slot 90*b* even though the medium insertion slot 90*b* is located rearward relative to the medium roll 6. With the printer 10 according to the present example embodiment, the user can perform the operation of inserting the recording medium 5 into the medium insertion slot 90*b* without having to see the area around the medium insertion slot 90*b*. Thus, it is unnecessary to look into the upper opening 11*b*, thereby making the operation easy.

As shown in FIG. 5, in the present example embodiment, with the forward sloping portion 91*a* of the rear apron 91, the lower end of the medium insertion slot 90*b* is wide, and the medium insertion slot 90*b* gradually narrows toward the upper end. As a result, the recording medium 5 is more easily guided into the guide passage 90*a*. Similarly, with the rearward sloping portion 92*a* of the guide apron 92, the lower end of the medium insertion slot 90*b* is wide, and the medium insertion slot 90*b* gradually narrows toward the upper end. This also makes it easier to guide the recording medium 5 into the guide passage 90*a*. In the present example embodiment, the rearward sloping portion 92*a* is located downward relative to the forward sloping portion 91*a*. Therefore, when an operation is performed so that the recording medium 5 is placed along the lower surface of the forward sloping portion 91*a*, the tip of the recording medium 5 is pressed against a portion of the guide apron 92 that is upward relative to the rearward sloping portion 92*a*. Therefore, also in this manner, the recording medium 5 can be successfully inserted into the medium insertion slot 90*b*.

The user can then feed the recording medium 5 upward to pass the recording medium 5 through the guide passage 90*a*. It is possible to further move the recording medium 5 onto the platen 30. The closure plate 106 prevents the recording medium 5 from slipping into the gap between the shaft 81 and the guide apron 92. The magnet 107 and the adhering plate 108 reduce or prevent the guide apron 92 from moving from the closed position P1 by the operation of inserting the recording medium 5 into the medium insertion slot 90*b* and the guide passage 90*a*.

At this time, the guide apron 92 is in the closed position P1 and the guide passage 90*a* is in the closed state (see FIG. 5). When the guide passage 90*a* is in the closed state so that the width of the guide passage 90*a* in the thickness direction of the recording medium 5 is narrow, the recording medium 5 can be fed more easily along the guide passage 90*a* downstream D1 in the insertion direction than when the guide passage 90*a* is in the open state (see FIG. 7).

After the recording medium 5 is fed at least further downstream in the secondary scanning direction X than between the grit rollers 71 and the pinch rollers 73*a*, the user pushes down the loading lever 82 so that the pinch roller 73*a* and the medium clamp 74 are in the pinch state. This allows the recording medium 5 to be fed or pulled back by the conveyor 70. At the same time, as shown in FIG. 7, the guide apron 92 is moved to the open position P2 by the apron moving mechanism 100, which is interlocked with the elevator 80.

The behavior of the recording medium 5 and the guide apron 92 during the pull-back operation will now be described. FIG. 12 is a vertical sectional view of the printer 10 schematically showing the state of the recording medium 5 during the pull-back operation. As shown in FIG. 12, when pulling back the recording medium 5, the recording medium 5 is pulled back through the guide passage 90*a* by the conveyor 70 and transferred downward. At this time, the pinch rollers 73*a* are in the pinch position. If the pinch rollers 73*a* are not in the pinch position, the recording medium 5 cannot be moved. At this time, the guide passage 90*a* is in the open state. When the recording medium 5 is pulled back after printing on the print surface 50, the print surface 5U moves in a path that is bulging rearward while opposing the front surface of the guide apron 92. At this time, if the guide apron 92 is in the closed position P1, the print surface 5U and the front surface of the guide apron 92 are likely to rub against each other. If the print surface 50 and the guide apron 92 rub against each other, the formed image may be damaged. Therefore, in the present example embodiment, the guide apron 92 is moved to the rearward open position P2 to reduce the risk of rubbing between the print surface 50 and the guide apron 92.

As mentioned above, when the recording medium 5 is first mounted, the recording medium 5 can be fed downstream D1 in the insertion direction more easily along the guide passage 90*a* when the guide passage 90*a* is in the closed state than in the open state. On the other hand, when printing or cutting the mounted recording medium 5, the width of the guide passage 90*a* is larger in the open state than in the closed state, which makes it easier to prevent damage to the print surface 5U. Here, with the printer 10, the recording medium 5 cannot be mounted unless the pinch rollers 73*a* are in the release state, and printing and cutting cannot be performed on the recording medium 5 unless the pinch rollers 73*a* are in the pinch state. That is, the situation in which it is preferable to keep the guide passage 90*a* in the closed state is the same as the situation in which the pinch rollers 73*a* need to be in the release state. The situation in which it is preferable to keep the guide passage 90*a* in the open state is the same as the situation in which the pinch rollers 73*a* need to be in the pinch state. Therefore, in the present example embodiment, the elevator 80 and the apron moving mechanism 100 are interlocked with each other. Such interlocking prevents the user from forgetting to set the guide passage 90*a* to the open state or the closed state, or from mistaking the open state for the closed state. Note however that the apron moving mechanism 100 may move the guide apron 92 between the closed position P1 and the open position P2 independently of the elevator 80.

As shown in FIG. 12, the recording medium 5 sagging from the transfer path Rm by the pull-back operation falls on the pull-back apron 110 and is gradually guided forward and downward along the downward slope of the pull-back apron 110. If the pull-back apron 110 is not provided, the sagging recording medium 5 folds over at the bottom of the housing portion 11. The recording medium 5 thus folded over increases the risk of damage to the print surface 50 and the risk of jams of the recording medium 5. Therefore, in the present example embodiment, the recording medium 5 is guided by the downward slope of the pull-back apron 110 to reduce these risks. In particular, the downward slope of the pull-back apron 110 prevents random piling of the recording medium 5 and reduces or prevents the risk of jams of the recording medium 5.

As shown in FIG. 12, the recording medium 5 guided downward and forward on the pull-back apron 110 exits the housing portion 11 through the gap 11*c* downward of the roll holder 20. Where there is no floor surface in front of the pull-back apron 110 (e.g., when the printer 10 is placed in the frontmost position on the table T; indicated by a two-dot-chain line in FIG. 12), the recording medium 5 that has exited through the gap 11*c* sags below the table T and then bends its path upward to return to the medium roll 6

(indicated by the path R1 in FIG. 12). Where there is a floor surface in front of the pull-back apron 110 (e.g., when the printer 10 is placed rearward relative to the frontmost position of the table T; indicated by a solid line in FIG. 12), the auxiliary apron 120 is used. In this case, the recording medium 5 that has exited through the gap 11c is guided forward on the auxiliary apron 120 and bends its path upward on the way to return to the medium roll 6 (indicated by the path R2 in FIG. 12). Where there is a floor surface in front of the pull-back apron 110, the frictional resistance of the floor surface may prevent the recording medium 5 from moving forward, resulting in a jam. In such cases, the auxiliary apron 120 can be used to avoid frictional resistance with the floor surface and prevent jams of the recording medium 5.

The functions/effects of the printer 10 according to the present example embodiment will now be described.

The printer 10 according to the present example embodiment includes the roll holder 20 that supports the medium roll 6, which is the recording medium 5 wound into a roll, so that the medium roll 6 can rotate in the front-rear direction, the platen 30 that is higher than the roll holder 20 and supports the recording medium 5 drawn from the medium roll 6, the print head 40 that is higher than the platen 30 so as to oppose the platen 30, the conveyor 70 that transfers the recording medium 5 forward on the platen 30, the rear apron 91 that is arranged rearward relative to the roll holder 20 and rearward and downward relative to the platen 30, extends in the up-down direction, and guides the recording medium 5 onto the platen 30, and the guide apron 92 that is arranged rearward of the rear apron 91 so as to oppose the rear apron 91 and extends in the up-down direction. The rear apron 91 and the guide apron 92 form the guide passage 90a therebetween through which the recording medium 5 is inserted. The guide apron 92 extends to a position downward relative to the rear apron 91.

In a printing device in which the recording medium is drawn from a medium roll, which is a wound recording medium, as in the paper feed path described in JP 2014-195895 A, a guide passage that guides the recording medium being transferred may be provided. In such a case, the user of the printing device inserts the end portion of the recording medium into the inlet of the guide passage. If the paper feed mechanism supporting the roll paper is provided on the front side and the inlet of the guide passage (paper feed path) is provided rearward thereof, as in the recording device described in JP 2014-195895 A, it is more convenient when replacing the roll paper, for example, but the operation of inserting the recording medium into the guide passage is more difficult to perform.

With the printer 10 according to the present example embodiment, the recording medium 5 drawn from the medium roll 6 is inserted into the inlet (the medium insertion slot 90b) of the guide passage 90a, which is arranged rearward relative to the roll holder 20. The guide passage 90a includes the rear apron 91 and the guide apron 92, which extend in the up-down direction and are aligned in the front-rear direction. The guide passage 90a extends in the up-down direction. Of the rear apron 91 and the guide apron 92, the guide apron 92, which is arranged rearward, extends to a position downward relative to the rear apron 91 arranged forward. Therefore, by placing the recording medium 5 against the guide apron 92 and pushing the recording medium 5 upward, the user can easily insert the recording medium 5 into the guide passage 90a extending in the up-down direction. Therefore, with the printer 10, the recording medium 5 can be easily inserted into the guide passage 90a even though the medium insertion slot 90b is located rearward relative to the medium roll 6.

In the present example embodiment, the conveyor 70 is capable of pulling back the recording medium 5 on the platen 30. The printer 10 includes the apron moving mechanism 100 that moves the guide apron 92 to the closed position P1 and to the open position P2 rearward relative to the closed position P1. According to such a configuration, the interval between the rear apron 91 and the guide apron 92 can be widened by retreating the guide apron 92 to the open position P2. Therefore, it is possible to reduce the risk of rubbing between the print surface 50 of the recording medium 5 and the guide apron 92 during the pull-back operation.

In the present example embodiment, the conveyor 70 includes the grit rollers 71 that are embedded in the platen 30 so that the upper end portions are exposed and that rotates in the front-rear direction, the pinch rollers 73a that are arranged upward of the platen 30 so as to oppose the grit rollers 71 and are capable of rotating in the front-rear direction, and the elevator 80 that is configured to move the pinch rollers 73a in the up-down direction, wherein the elevator 80 moves the pinch rollers 73a to the release position spaced away from the grit rollers 71 and to the pinch position such that the recording medium 5 can be pinched between the pinch rollers 73a and the grit rollers 71. The apron moving mechanism 100 is interlocked with the elevator 80, wherein the apron moving mechanism 100 moves the guide apron 92 to the closed position P1 when the pinch rollers 73a are moved by the elevator 80 to the release position, and the apron moving mechanism 100 moves the guide apron 92 to the open position P2 when the pinch rollers 73a are moved to the pinch position. With such a configuration, through the operation of moving the pinch rollers 73a to the pinch position or the release position, the guide passage 90a can be set to the open state or the closed state at the same time. Therefore, by performing the operation of moving the pinch rollers 73a to the pinch position or the release position, there is no need to perform the operation of setting the guide passage 90a to the open state or the closed state, thereby reducing the work of the user. It also prevents the user from forgetting to put the guide passage 90a to the open state or the closed state, or from mistaking the open state for the closed state.

In the present example embodiment, the elevator 80 includes the loading lever 82 that can be operated to thereby move the pinch rollers 73a. The apron moving mechanism 100 includes the open/close link mechanism 101 connected to the loading lever 82 and the guide apron 92. With such a configuration, the loading lever 82, which is always operated when switching the state of the pinch rollers 73a between the release state and the pinch state, can be linked to the guide apron 92, thereby easily realizing the interlock between the apron moving mechanism 100 to the elevator 80.

Note however that the method of interlocking the apron moving mechanism 100 and the elevator 80 is not limited to that of linking the loading lever 82 and the guide apron 92. The method of interlocking the apron moving mechanism 100 and the elevator 80 may be an electrical method, for example. In that case, the apron moving mechanism 100 may include an electrically controlled actuator, such as an electric motor or an air cylinder controlled by a solenoid valve.

In the present example embodiment, the apron moving mechanism 100 includes the magnet 107 as the first adhering portion that is fixed to the guide apron 92, and the adhering plate 108 as the second adhering portion that is arranged at a position adjacent to the magnet 107 when the guide apron 92 is in the closed position P1, wherein the adhering plate 108 adheres to the magnet 107. With such a configuration, the guide apron 92 is firmly held in the closed position P1 by means of adhesion between the magnet 107 and the adhering plate 108. Therefore, the guide apron 92 can be held in the closed position P1 even if the guide apron 92 is pushed during the operation of inserting the recording medium 5 into the guide passage 90*a*, for example. This makes easier, for example, the operation of inserting the recording medium 5 into the guide passage 90*a*. One of the first adhering portion and the second adhering portion includes a magnet, and the other includes a magnetic metal. In the present example embodiment, the magnet 107 as the first adhering portion includes a magnet and the adhering plate 108 as the second adhering portion includes a magnetic metal. With such a configuration, adhesion between the first adhering portion and the second adhering portion can be easily achieved by the magnetic force between the magnet and the magnetic metal.

In the present example embodiment, the shaft 81 of the elevator 80 is arranged forward relative to the guide apron 92 and away from the guide apron 92. The printer 10 includes the closure plate 106, of which the rear end is fixed to the guide apron 92 and a portion that is forward relative to the rear end is in contact with the shaft 81. The closure plate 106 is flexible, and closes the gap between the guide apron 92 and the shaft 81 when the guide apron 92 is in the closed position P1, the open position P2, and an intermediate position between the closed position P1 and the open position P2. With such a configuration, because the closure plate 106 is flexible and is in contact with the shaft 81 regardless of the positional relationship with the shaft 81, the gap between the guide apron 92 and the shaft 81 can be closed at all times. Such closing of the gap prevents erroneous insertion of the recording medium 5 into the gap between the guide apron 92 and the shaft 81.

In the present example embodiment, the guide apron 92 includes the rearward sloping portion 92*a* that is formed at the lower end portion 92D and sloping downward while extending rearward. With such configuration, the rearward sloping portion 92*a* of the guide apron 92 widens the lower end of the medium insertion slot 90*b* and gradually narrows the medium insertion slot 90*b* toward the upper end. This allows the recording medium 5 to be inserted more easily into the guide passage 90*a*.

In the present example embodiment, the rear apron 91 includes the forward sloping portion 91*a* at the lower end portion 91D and sloping downward while extending forward. The rearward sloping portion 92*a* is located downward relative to the forward sloping portion 91*a*. With such a configuration, the forward sloping portion 91*a* of the rear apron 91 widens the lower end of the medium insertion slot 90*b* and gradually narrows the medium insertion slot 90*b* toward the upper end. As a result, the recording medium 5 can be more easily inserted into the guide passage 90*a*. Furthermore, if the recording medium 5 is pushed in so that the recording medium 5 is placed along the lower surface of the forward sloping portion 91*a*, the tip of the recording medium 5 is placed against a portion of the guide apron 92 that is upward relative to the rearward sloping portion 92*a*. The recording medium 5 then moves smoothly upward along the front surface of the guide apron 92. Thus, the recording medium 5 can be successfully inserted into the guide passage 90*a*.

The printer 10 according to the present example embodiment includes the housing portion 11 that houses at least a portion of the roll holder 20 and supports the platen 30, the print head 40, the rear apron 91, the guide apron 92, etc. The rear apron 91 and the guide apron 92 are arranged rearward and upward relative to the roll holder 20, and a portion of the front surface 11F of the housing portion 11 that is upward relative to the roll holder 20 is provided with the upper opening 11*b*, which is large enough for the user to pass their hand through. With such a configuration, the user can pass their hand into the housing portion 11 through the upper opening 11*b* and insert the end portion of the recording medium 5 drawn from the medium roll 6 into the guide passage 90*a*. The medium insertion slot 90*b*, which is the inlet of the guide passage 90*a*, is located rearward and upward relative to the roll holder 20 in the interior space 11*a* of the housing portion 11. Therefore, the upper opening 11*b*, which is located upward relative to the roll holder 20, makes easier the operation of inserting the recording medium 5 into the medium insertion slot 90*b*.

The printer 10 according to the present example embodiment includes the pull-back apron 110 provided downward of, and away from, the transfer path Rm of the recording medium 5. The pull-back apron 110 is capable of receiving the recording medium 5 pulled back toward the roll holder 20, and includes the receiving portion 110*a* that slopes downward and extends forward.

With such a such printer 10, when the recording medium 5 sagging from the transfer path Rm by the pull-back operation of the conveyor 70 falls on the receiving portion 110*a*, the recording medium 5 is gradually guided forward along the downward slope of the receiving portion 110*a*. This suppresses the problem that the recording medium 5 having been transferred off the transfer path Rm may pile up without being transferred forward. Therefore, it is possible to suppress jams of the recording medium 5. Note that, as will be described later, similar functions/effects can be achieved even if the downward slope of the receiving portion 110*a* is a slope that slopes downward and extends rearward.

In the present example embodiment, the medium insertion slot 90*b* is located rearward relative to the roll holder 20 and the platen 30 and upward relative to the receiving portion 110*a*. The receiving portion 110*a* is provided so as to oppose the medium insertion slot 90*b* and slopes downward and extends forward. With such a configuration, the recording medium 5 falling from the medium insertion slot 90*b* onto the receiving portion 110*a* is guided toward the roll holder 20 forward of the medium insertion slot 90*b* along the downward slope of the receiving portion 110*a*. This makes smooth the return path of the slackened recording medium 5 and suppresses the occurrence of jams of the recording medium 5.

In the present example embodiment, the receiving portion 110*a* extends to a position rearward relative to the medium insertion slot 90*b*. With such a configuration, it is possible to receive the recording medium 5 that is sagging by being tilted rearward relative to a position directly below the medium insertion slot 90*b*, during the pull-back operation, for reasons such as those described above, for example.

In the present example embodiment, the front end of the receiving portion 110*a* is located downward relative to the roll holder 20. Between the front end of the receiving portion 110*a* and the roll holder 20, the gap 11*c* is provided through which the recording medium 5 can pass with the medium roll 6 mounted on the roll holder 20. With such a configuration, when the pull-back distance is long, the recording medium 5 having become slackened from the transfer path Rm can be taken out of the housing portion 11 through the gap 11*c*. This can reduce or prevent jams of the recording medium 5 due to the longer pull-back distance and the recording medium 5 having no place to go in the housing portion 11.

In the present example embodiment, the receiving portion 110*a* includes a group of rollers including a plurality of rollers capable of rotating in the front-rear direction. Here, the rollers are the rollers 113, and the receiving portion 110*a* includes a plurality of rollers 113 as a group of rollers. With such a configuration, the recording medium 5 can be pulled back on the receiving portion 110*a* by the plurality of rollers 113 rotating in the front-rear direction without rubbing the print surface 5U. Here, it is possible to suppress the print surface 5U from contacting, and rubbing against, the inclined plate 111 of the receiving portion 110*a*.

In the present example embodiment, the group of rollers includes, for example, three or more roller rows 113C that are arranged in alignment in the left-right direction, each roller row 113C including a plurality of rollers 113. With such a configuration, a recording medium 5 with a narrow width can be received by using two roller rows 113C that are close in distance, and a recording medium 5 with a wide width can be received by further using another roller row 113C. Thus, since the receiving portion 110A includes three or more roller rows 113C, recording mediums 5 of different widths can be received by the roller rows 113C.

In the present example embodiment, the receiving portion 110*a* of the pull-back apron 110 includes the roller supports 112 that rotatably support a plurality of rollers 113 of the roller rows 113C. The medium-supporting surface 113*a*1 of each roller 113 protrudes upward relative to the upper surface 112*b* of the roller support 112. The center of rotation 113*b*1 of each roller 113 is located downward relative to the upper surface 112*b* of the roller support 112. With such a configuration, for the reasons described above, the recording medium 5 is prevented from being caught in the gap between the rollers 113 and the roller supports 112, and it is possible to smoothly move the recording medium 5.

In the present example embodiment, the pull-back apron 110 and the auxiliary apron 120 as a receiver include the auxiliary apron 120 as an extended receiving portion that is continuous with and extends forward from the front end of the receiving portion 110*a* of the pull-back apron 110. With such a configuration, the auxiliary apron 120 can receive the recording medium 5 that is returned to a position forward relative to the receiving portion 110*a* and sags downward to touch the floor surface. Thus, the recording medium 5 can move forward without being inhibited by friction with the floor surface. That results in preventing a jam of the recording medium 5. With such a configuration, the print surface 50 of the recording medium 5 can be prevented from contacting the floor surface. That results in preventing the damage of the print surface 50 of the recording medium 5.

In the present example embodiment, the auxiliary apron 120 also includes a group of rollers including a plurality of rollers 123 configured to be capable of rotating in the front-rear direction. With such a configuration, the recording medium 5 can be pulled back on the auxiliary apron 120 without rubbing the print surface 5U, as in the case of the receiving portion 110*a*.

The printer 10 according to the present example embodiment includes the cutting head 50 including the cutter 52 capable of cutting the recording medium 5 and provided upward relative to the platen 30 so as to oppose the platen 30, the head moving device 60 that moves the cutting head 50 in the left-right direction, and the controller 130. The controller 130 controls the head moving device 60 and the conveyor 70 according to the cutting data so that the cutting head 50 moves in the left-right direction and the recording medium 5 is transferred forward or pulled back rearward on the platen 30. With such a printer 10, a pull-back operation occurs due to cutting. Therefore, the pull-back apron 110 and the auxiliary apron 120 as the receiver, the apron moving mechanism 100 that retracts the guide apron 92 rearward, etc., realize advantageous effects.

Other Example Embodiments

The configuration of an inkjet printer according to one preferred example embodiment has been described above. However, the example embodiment described above is merely illustrative, and the present invention can be implemented in other example embodiments. Some other example embodiments will be described below. Note that in the following description of other example embodiments, like reference sings to those of the example embodiment described above will be used for like elements to those of the example embodiment described above.

For example, the printer 10 according to the example embodiment described above is configured so that the guide apron 92 can move to widen the guide passage 90*a*. However, the guide passage 90*a* does not need to be configured to be able to change the state. The guide passage 90*a* may be fixed.

The method of moving the guide apron 92 is not limited to the pivotal method as in the example embodiment described above. The guide apron 92 may be configured to be capable of sliding in the front-rear direction, for example.

In the example embodiment described above, the rear apron 91 and the guide apron 92 are configured to include the forward sloping portion 91*a* and the rearward sloping portion 92*a*, respectively, to make it easier to insert the recording medium 5 into the medium insertion slot 90*b*. However, there is no particular limitation on the shape of the tip portion of the rear apron 91 and that of the guide apron 92. The tip portions of the rear apron 91 and the guide apron 92 may be straight, for example.

Figure 13:
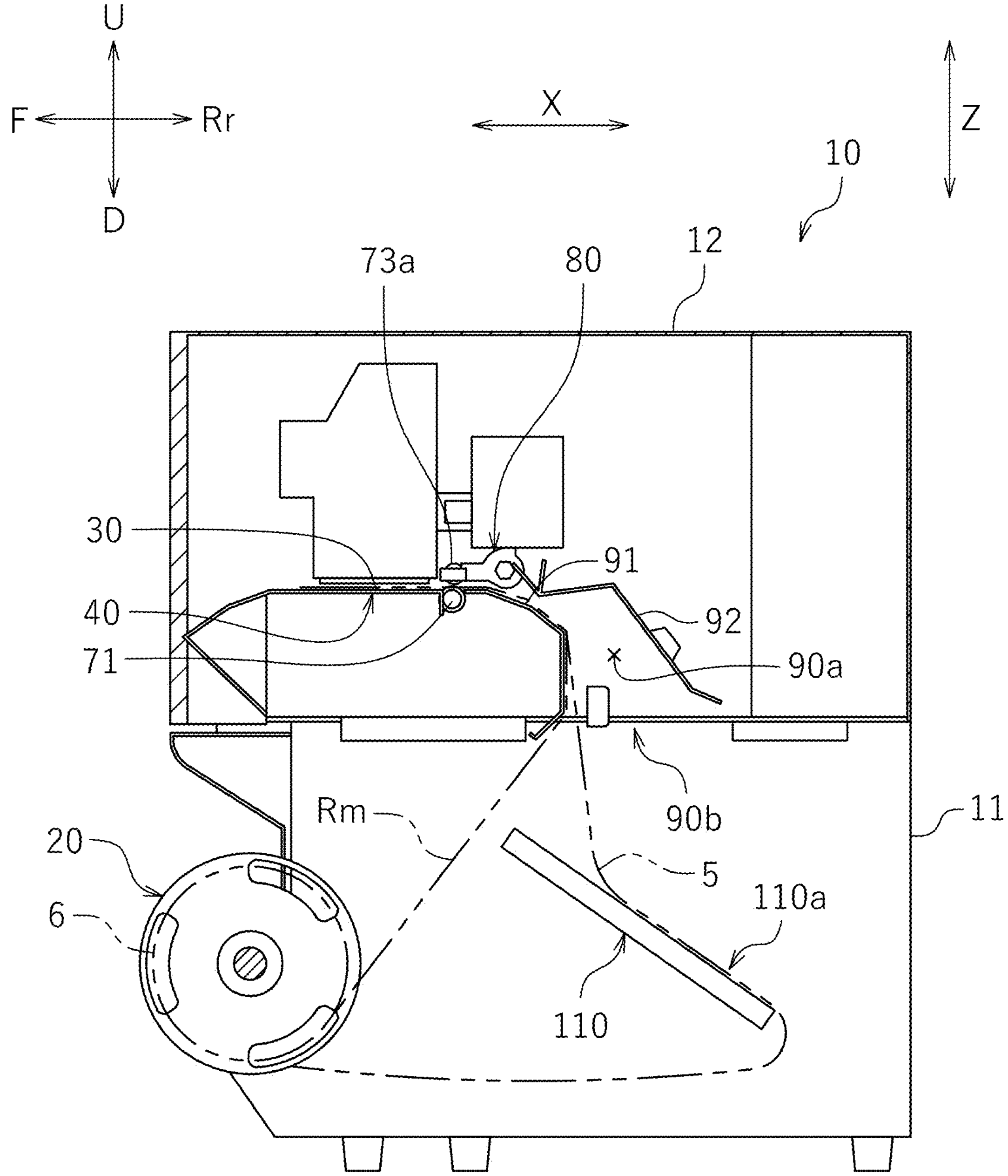
FIG. 13 is a vertical sectional view showing a printer in a manner in which a pull-back apron is reverse-sloped.

The pull-back apron 110 may be sloped in the opposite direction to the example embodiment described above. FIG. 13 is a vertical sectional view showing the printer 10, wherein the pull-back apron 110 is sloped in the opposite direction. The printer 10 shown in FIG. 13 is similar to the example embodiment described above, except for the pull-back apron 110. As shown in FIG. 13, in this example embodiment, the pull-back apron 110 slopes downward and extends rearward. The recording medium 5 sagging from the transfer path Rm due to the pull-back operation falls onto the pull-back apron 110 and is guided rearward and downward along the downward slope of the pull-back apron 110. The recording medium 5 extends forward from a position downward of the rear end of the pull-back apron 110 and through downward of the pull-back apron 110 to reach the medium roll 6. While the path of the recording medium 5 shown in FIG. 13 is merely an example, even if the pull-back apron 110 has the opposite slope to that of the example embodiment described above, it is possible to reduce or prevent the piling up and jamming of the pulled-back recording medium 5.

In the example embodiment described above, the pull-back apron 110 includes a plurality of rollers 113 that rotate in the front-rear direction. However, the pull-back apron 110 may be configured to receive the recording medium 5 via a slope without including rollers such as the rollers 113.

The printer 10 according to the example embodiment described above is provided with the housing portion 11 that supports the printer body 12 in which main portions of the printer 10 are integrated, houses at least a portion of the roll holder 20, and forms the internal space 11*a* in which the recording medium 5 is transferred. However, the printer 10 does not need to include such a housing portion 11.

The pulled-back recording medium 5 does not need to be pulled out of the printer 10. In that case, there is no need for the gap 11*c* downward of the roll holder 20 and the auxiliary apron 120. Even in the case where the pulled-back recording medium 5 is pulled out of the printer 10, the auxiliary apron 120 may not always be necessary. For example, the pulled-back recording medium 5 may be pulled out of the printer 10 from a height such that the recording medium 5 does not touch the floor surface.

In the example embodiment described above, the printer 10 is a printer with cutting head including the cutting head 50. However, the printer 10 may be a printer without the cutting head 50.

The present invention is not limited to these example embodiments unless specifically noted otherwise.

The terms and expressions used herein are for description only and are not to be interpreted in a limited sense. These terms and expressions should be recognized as not excluding any equivalents to the elements shown and described herein and as allowing any modification encompassed in the scope of the claims. The present invention may be embodied in many various forms. This disclosure should be regarded as providing example embodiments of the principles of the present invention. These example embodiments are provided with the understanding that they are not intended to limit the present invention to the example embodiments described in the specification and/or shown in the drawings. The present invention is not limited to the example embodiments described herein. The present invention encompasses any of example embodiments including equivalent elements, modifications, deletions, combinations, improvements and/or alterations which can be recognized by a person of ordinary skill in the art based on the disclosure. The elements of each claim should be interpreted broadly based on the terms used in the claim, and should not be limited to any of the example embodiments described in this specification or used during the prosecution of the present application.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A printing device comprising:

a roll holder to support a medium roll, which is a recording medium wound into a roll, so that the medium roll can rotate in a front-rear direction;

a support table that is higher than the roll holder and supports the recording medium drawn from the medium roll;

a print head that is higher than the support table so as to oppose the support table;

a conveyor to transfer the recording medium in the front-rear direction on the support table and forward on the support table to draw the recording medium from the medium roll, and transfer the recording medium rearward on the support table to pull back the recording medium toward the roll holder;

a receiver that is below and spaced away from a transfer path of the recording medium extending from the medium roll to the support table along which the recording medium is drawn from the medium roll and transferred; and a first guide and a second guide opposing each other to define a guide passage therebetween through which the recording medium is inserted; wherein the receiver is capable of receiving the recording medium pulled back toward the roll holder, and includes a receiving portion that slopes downward and extends forward;

a lower end portion of the first guide and a lower end portion of the second guide define a medium insertion slot through which the recording medium is insertable into the guide passage;

the medium insertion slot is located rearward relative to the roll holder and the support table and upward relative to the receiving portion;

the receiving portion opposes the medium insertion slot; and the receiving portion extends to a position rearward relative to the medium insertion slot.

2. The printing device according to claim 1, wherein a front end of the receiving portion is located lower than the roll holder; and a gap is provided between the front end of the receiving portion and the roll holder such that the recording medium can pass through the gap with the medium roll mounted on the roll holder.

3. The printing device according to claim 1, wherein the receiver includes an extended receiving portion that is continuous with and extends forward from a front end of the receiving portion.

4. The printing device according to claim 3, wherein the extended receiving portion includes a group of rollers including a plurality of rollers each capable of rotating in the front-rear direction.

5. The printing device according to claim 1, further comprising:

a cutting head including a cutter capable of cutting the recording medium and higher than the support table so as to oppose the support table;

a head mover to move the cutting head in a left-right direction; and a controller configured or programmed to control the print head, the conveyor, and the head mover; wherein the controller is configured or programmed to control the head mover and the conveyor according to cutting data so that the cutting head is movable in the left-right direction and the recording medium is transferrable forward or rearward on the support table.

6. A printing device comprising:

a roll holder to support a medium roll, which is a recording medium wound into a roll, so that the medium roll can rotate in a front-rear direction;

a support table that is higher than the roll holder and supports the recording medium drawn from the medium roll;

a print head that is higher than the support table so as to oppose the support table;

a conveyor to transfer the recording medium in the front-rear direction on the support table and forward on the support table to draw the recording medium from the medium roll, and transfer the recording medium rearward on the support table to pull back the recording medium toward the roll holder; and a receiver that is below and spaced away from a transfer path of the recording medium extending from the medium roll to the support table along which the recording medium is drawn from the medium roll and transferred; wherein the receiver is capable of receiving the recording medium pulled back toward the roll holder, and includes a receiving portion that slopes downward and extends forward or rearward;

the receiving portion includes a group of rollers including a plurality of rollers each capable of rotating in the front-rear direction; and the group of rollers include three or more roller rows that are arranged in alignment in a left-right direction, each of the roller rows including a plurality of rollers aligned in the front-rear direction.

7. The printing device according to claim 6, wherein the receiving portion includes a support that rotatably supports the rollers of one of the roller rows;

a medium-supporting surface of each of the rollers of the one of the roller rows protrudes upward relative to an upper surface of the support; and a center of rotation of each of the rollers of the one of the roller rows is located downward relative to the upper surface of the support.

8. A printing device comprising:

a roll holder to support a medium roll, which is a recording medium wound into a roll, so that the medium roll can rotate in a front-rear direction;

a support table that is higher than the roll holder and supports the recording medium drawn from the medium roll;

a print head that is higher than the support table so as to oppose the support table;

a conveyor to transfer the recording medium in the front-rear direction on the support table and forward on the support table to draw the recording medium from the medium roll, and transfer the recording medium rearward on the support table to pull back the recording medium toward the roll holder;

a receiver that is below and spaced away from a transfer path of the recording medium extending from the medium roll to the support table along which the recording medium is drawn from the medium roll and transferred;

a first guide that is arranged rearward relative to the roll holder and rearward and downward relative to the support table and extends in an up-down direction to guide the recording medium onto the support table;

a second guide that is arranged rearward of the first guide so as to oppose the first guide and extends in the up-down direction; and a moving mechanism to move the second guide to a first position and to a second position, which is rearward relative to the first position; wherein the receiver is capable of receiving the recording medium pulled back toward the roll holder, and includes a receiving portion that slopes downward and extends forward or rearward;

the first guide and the second guide define a guide passage therebetween through which the recording medium is inserted, the second guide extending to a position downward relative to the first guide;

the conveyor includes:

a transfer roller that is embedded in the support table so that an upper end portion thereof is exposed, and rotates in the front-rear direction;

a pinch roller that is arranged upward of the support table so as to oppose the transfer roller, and is capable of rotating in the front-rear direction; and an elevator to move the pinch roller in the up-down direction to a release position spaced away from the transfer roller and to a pinch position such that the recording medium can be pinched between the pinch roller and the transfer roller; wherein the moving mechanism is interlocked with the elevator to move the second guide to the first position when the pinch roller is moved to the release position by the elevator and move the second guide to the second position when the pinch roller is moved to the pinch position by the elevator.

9. The printing device according to claim 8, wherein the elevator includes an operation lever that is operable to move the pinch roller; and the moving mechanism includes a link mechanism connected to the operation lever and the second guide.

10. The printing device according to claim 8, wherein the moving mechanism includes:

a first adhering portion that is fixed to the second guide; and a second adhering portion that is arranged at a position adjacent to the first adhering portion when the second guide is in the first position; wherein the second adhering portion adheres to the first adhering portion.

11. The printing device according to claim 10, wherein one of the first adhering portion and the second adhering portion includes a magnet, and the other includes a magnetic metal.

12. The printing device according to claim 8, further comprising:

another structure spaced that is arranged forward relative to the second guide and spaced away from the second guide; and a closure plate, of which a rear end is fixed to the second guide and a portion that is forward relative to the rear end is in contact with the other structure; wherein the closure plate is flexible, and closes a gap between the second guide and the other structure when the second guide is in the first position, the second position, and an intermediate position between the first position and the second position.

13. The printing device according to claim 8, wherein the second guide includes a first sloping portion that is located at a lower end portion thereof and sloping downward while extending rearward.

14. The printing device according to claim 13, wherein the first guide includes a second sloping portion that is located at a lower end portion thereof and sloping downward while extending forward; and the first sloping portion is located downward relative to the second sloping portion.

15. The printing device according to claim 8, further comprising:

a housing that houses at least a portion of the roll holder and supports the support table, the print head, the first guide and the second guide; wherein the first guide and the second guide are higher than the roll holder; and a portion of a front surface of the housing that is higher than the roll holder is provided with an opening that is large enough to allow a user to pass their hand through.

* * * * *